United States Patent
Hoefler et al.

(10) Patent No.: US 12,365,546 B1
(45) Date of Patent: Jul. 22, 2025

(54) BULK CONTAINER FILLER STATION AND RELATED METHODS

(71) Applicant: HaF Equipment LLC, Maplewood, MN (US)

(72) Inventors: Peter Hoefler, Dellwood, MN (US); Erik Johnson, Mendota Heights, MN (US); Casey Hoefler, Dellwood, MN (US); Samuel Lucas, Maplewood, MN (US)

(73) Assignee: HaF Equipment LLC, Maplewood, MN (US)

( * ) Notice: Subject to any disclaimer, the term of this patent is extended or adjusted under 35 U.S.C. 154(b) by 0 days.

(21) Appl. No.: 18/770,996

(22) Filed: Jul. 12, 2024

Related U.S. Application Data

(63) Continuation-in-part of application No. 17/692,776, filed on Mar. 11, 2022, now abandoned.

(60) Provisional application No. 63/159,685, filed on Mar. 11, 2021, provisional application No. 63/161,796, filed on Mar. 16, 2021, provisional application No.
(Continued)

(51) Int. Cl.
  *B65G 29/02* (2006.01)
  *B65B 1/22* (2006.01)
  *B65G 65/32* (2006.01)

(52) U.S. Cl.
  CPC ............... *B65G 29/02* (2013.01); *B65B 1/22* (2013.01); *B65G 65/32* (2013.01)

(58) Field of Classification Search
  CPC ...... B65G 29/02; B65G 65/32; B65G 47/902; B65G 47/901; B65G 47/90; B65G 47/904; B65G 47/02; B65B 1/22; B65B 1/06; B65B 1/04; B65B 3/04; B65B 69/0008;
(Continued)

(56) References Cited

U.S. PATENT DOCUMENTS

| | | |
|---|---|---|
| 3,638,804 A | 2/1972 | Blakeway |
| 3,876,088 A | 4/1975 | Klaus |

(Continued)

FOREIGN PATENT DOCUMENTS

| | | |
|---|---|---|
| DE | 4303261 A1 | 8/1994 |
| DE | 1020005005018 | 10/2005 |

(Continued)

OTHER PUBLICATIONS

European Search Report dated Nov. 15, 2022 in European Patent Application No. 20770907.
(Continued)

*Primary Examiner* — Glenn F Myers
(74) *Attorney, Agent, or Firm* — DeWitt LLP; Brian R. Pollack, Esq.

(57) ABSTRACT

Systems, methods, and apparatus are disclosed herein for filling and transporting a bulk container. In particular, embodiments of the present disclosure provide for a bulk container handling assembly for filing a bulk container in a clean room at a first location, transporting the bulk container outside of the clean room, and disposing of the bulk container at a second location. During transportation, the bulk container handling assembly can move a bulk container through an environmental barrier. The bulk container handling assembly is stationary and configured with a low pivot point such that the base of the bulk container handling assembly remains in the clean room.

20 Claims, 18 Drawing Sheets

Related U.S. Application Data

63/164,325, filed on Mar. 22, 2021, provisional application No. 63/180,785, filed on Apr. 28, 2021, provisional application No. 63/514,186, filed on Jul. 18, 2023, provisional application No. 63/514,194, filed on Jul. 18, 2023, provisional application No. 63/550,166, filed on Feb. 6, 2024.

(58) Field of Classification Search
CPC ........... H01L 21/67739; H01L 21/6773; H01L 21/67736; H01L 21/67742
USPC .................... 414/639, 637, 638, 697, 743
See application file for complete search history.

(56) References Cited

U.S. PATENT DOCUMENTS

| | | | |
|---|---|---|---|
| 4,032,138 A | | 6/1977 | Willis |
| 4,527,716 A | | 7/1985 | Haas et al. |
| 4,921,394 A | * | 5/1990 | Watson ............... B60P 1/6472 |
| | | | 414/547 |
| 5,322,095 A | * | 6/1994 | Bolz .................... B65B 31/024 |
| | | | 141/93 |
| 6,089,670 A | * | 7/2000 | Rogers ................ B60P 1/486 |
| | | | 414/500 |
| 6,283,699 B1 | * | 9/2001 | Simpson ............. B60P 1/6472 |
| | | | 414/547 |
| 6,851,915 B2 | | 2/2005 | Warner |
| 7,223,058 B2 | | 5/2007 | Nyhof |
| 7,287,946 B2 | | 10/2007 | Bonerb |
| 9,050,924 B2 | | 6/2015 | Scherf |
| 9,126,523 B2 | | 9/2015 | Ogita |
| 10,093,481 B2 | | 10/2018 | Snape |
| 10,232,757 B2 | | 3/2019 | Sawatzky |
| 2003/0206790 A1 | | 11/2003 | Nyhof |
| 2012/0301260 A1 | * | 11/2012 | Bonora ............... H01L 21/6773 |
| | | | 74/57 |
| 2016/0114972 A1 | | 4/2016 | Snape |
| 2021/0375653 A1 | * | 12/2021 | Kuo ................... H01L 21/67757 |
| 2021/0387762 A1 | | 12/2021 | Hoefler |

FOREIGN PATENT DOCUMENTS

| | | |
|---|---|---|
| DE | 10 2009 020600 A1 | 11/2010 |
| FR | 2797438 A1 | 2/2001 |
| RU | 2039685 C1 | 3/1995 |
| RU | 2280003 C1 | 6/2006 |
| RU | 2381171 C1 | 2/2010 |
| SU | 850535 A1 | 7/1981 |

OTHER PUBLICATIONS

Written Opinion mailed Jun. 18, 2020 in PCT/US2020/022865.
International Search Report mailed Jun. 18, 2020 in PCT/US2020/022865.
Rule 132 Declaration dated Nov. 14, 2024 filed in U.S. Appl. No. 17/460,450.

\* cited by examiner

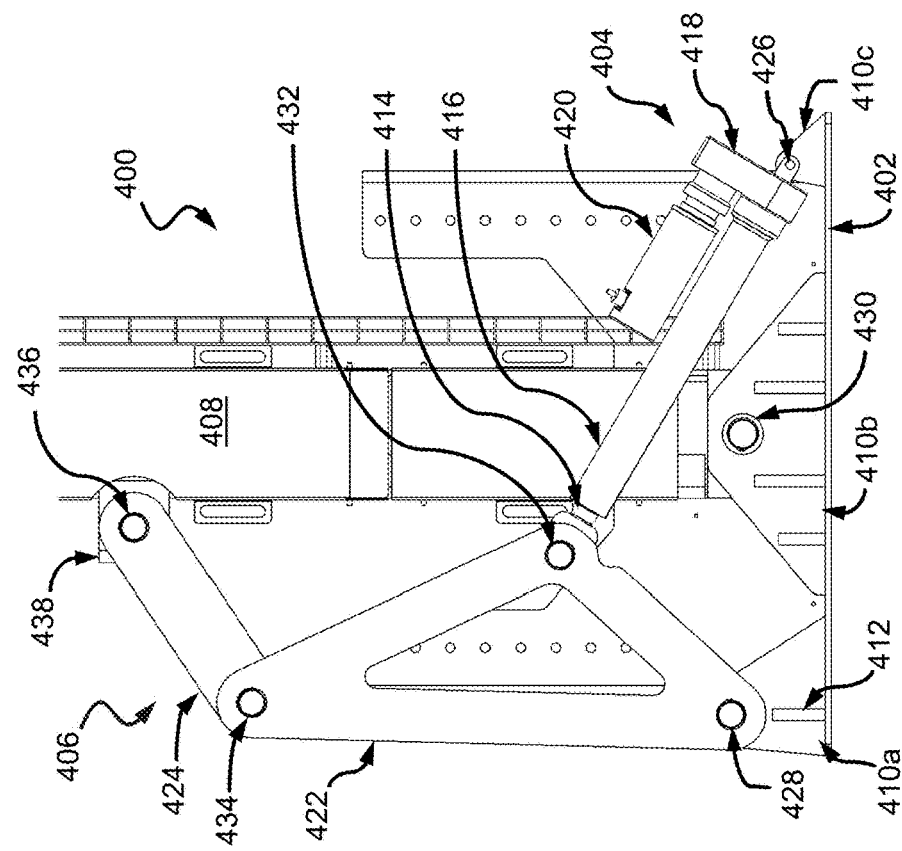
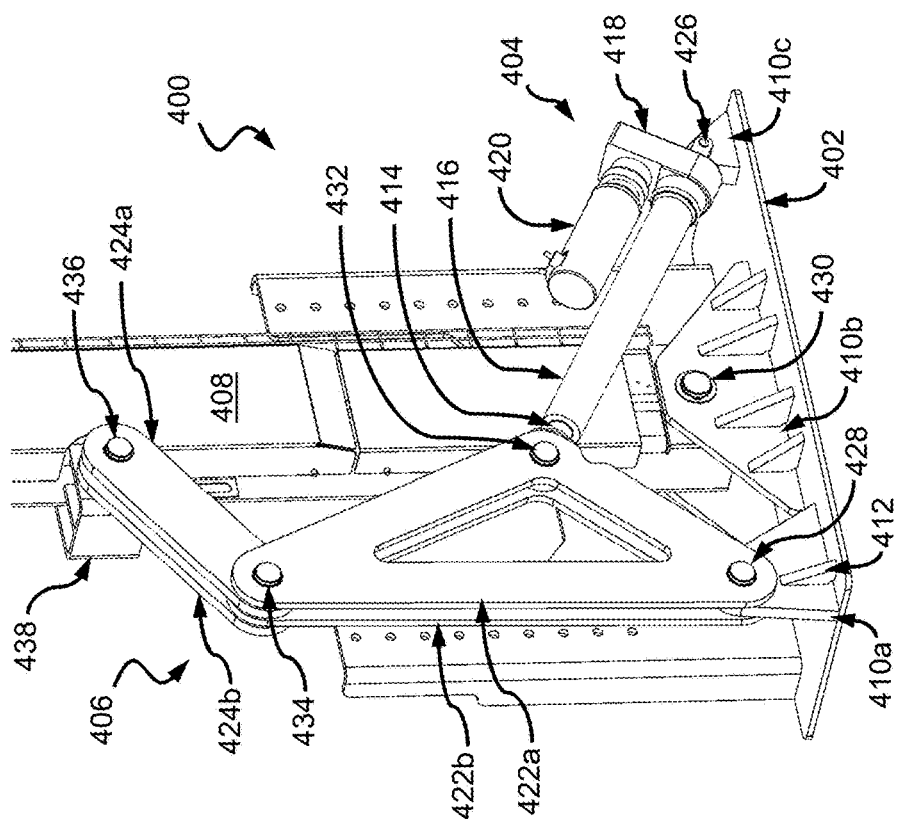

BULK CONTAINER FILLER STATION AND RELATED METHODS

CROSS REFERENCE TO RELATED APPLICATIONS

The present patent application is a continuation-in-part of and claims the benefit of priority to U.S. patent application Ser. No. 17/692,776, filed Mar. 11, 2022, which in turn claims the benefit of priority to U.S. Provisional Patent Application No. 63/159,685, filed Mar. 11, 2021, U.S. Provisional Patent Application No. 63/161,796, filed Mar. 16, 2021, U.S. Provisional Patent Application No. 63/164,325, filed Mar. 22, 2021, and U.S. Provisional Patent Application No. 63/180,785, filed Apr. 28, 2021. The present patent application also claims the benefit of priority to U.S. Provisional Patent Application No. 63/514,186, filed Jul. 18, 2023, U.S. Provisional Patent Application No. 63/514,194, filed Jul. 18, 2023, and U.S. Provisional Patent Application No. 63/550,166, filed Feb. 6, 2024. Each of the aforementioned patent applications is hereby incorporated by reference in its entirety for any purpose whatsoever.

BACKGROUND

Bulk containers (e.g., bulk bags capable of retaining from about 15 ft3 up to about 100 ft3 of product) are used in various industries, such as agriculture, chemicals, food processing, and construction materials, to handle large quantities of bulk materials. For example, powered and granular products, such as sugar, flour, plastic pellets, etc. are commonly packaged, shipped, and dispensed on a commercial scale using bulk bags. Bulk bags are available from a number of suppliers, including Bulk Sak, Inc. of Malvern, Arkansas, National Packaging Services, Inc. of Hackensack, New Jersey, and B.A.G. Corp of Dallas, Texas.

Bulk bags are commonly equipped with four loading loops, including one at each upper corner to facilitate loading of the bulk bag onto a discharge platform for dispensing product from the bag through a discharge spout in the bottom of the bag. Bulk bag discharge stations are typically equipped with a gantry crane for loading bulk bags onto the discharge platform of the station. While effective for quickly and efficiently loading bulk bags, gantry cranes are bulky and hazardous to operate. For example, bulk bags-often weighing a thousand pounds or more-tend to sway significantly while suspended from a crane.

Conventional transportation mechanisms, such as gantry cranes, overhead trolleys, and rail systems, present several disadvantages including contamination risk, maintenance difficulties, and regulatory noncompliance. These disadvantages are particularly present when loading of the bulk container occurs in a clean room environment (e.g., as may be necessary for foodstuffs).

Overhead rail systems and I-beams can harbor or produce dust, lubricants, debris, and other contaminants that are not acceptable in clean room environments. For example, the movement of bulk containers on rails can generate particulates (e.g., metal grindings, pain chippings) from friction and abrasion, which can compromise the clean room's quality standards. Conventional systems can often be difficult to clean and maintain due to many moving parts, crevices, and surfaces. These moving parts are often positioned directly above the bulk container (e.g., as the bulk container is being loaded), potentially causing lubricants and/or debris to periodically fall into the product retained within the bulk container when the top of the bag is open. In some cases, loading a bulk container onto and off of a hoist introduces inefficiencies in the transport process.

Clean rooms, especially those in agriculture or pharmaceutical industries, often need to comply with strict regulatory standards. Conventional bulk container transportation systems may not meet these standards due to their potential for contamination and difficulty in ensuring sterility. For example, bulk bags transported along rails can generate static electricity, which can attract dust and particles while the bag is being transported out of the clean room. This is problematic when the bag carrying mechanism of the conveyor or rail apparatus returns to the clean room where maintaining a particle-free environment is critical.

Accordingly, a substantial need exists for a compact bulk container filling and transport station that avoids the safety concerns and potential for product contamination presented by the use of conventional systems to load and move bulk containers.

SUMMARY

Systems, methods, and apparatus are disclosed herein for efficiently filling and transporting bulk containers. In particular, embodiments of the present disclosure provide for compact bulk container filling and transportation assemblies that mitigate contamination.

In one aspect, embodiments of the present disclosure provide for a lifting mechanism for bulk containers. In some embodiments, the length of arms of the bulk container filling and transport station can allow for transporting a bulk container to a second location without the use of a separate transport system (e.g., that may require attaching the bulk bag to a separate mechanism). For example, embodiments of the present disclosure can securely move a bulk bag through a barrier, such as a clean room barrier.

In one aspect, embodiments of the present disclosure provide for a linkage mechanism for lifting bulk containers with a low pivot point. In some embodiments, a cylinder mounting to four-bar linkage mechanism allows for a base of the bulk container filling and transport station to remain in a clean room environment. In some embodiments, the linkage mechanism can allow for transportation of a bulk container with a compact operational envelope (e.g., minimal footprint and range of movement).

In one aspect, embodiments of the present disclosure provide for a filler head discrete from the bulk container filling and transportation system. In some embodiments, the filler head is mounted to a surge bin. In some embodiments, the change filler head can be retractable, for example, following filling cycles. Use of a retractable filler head allows for the filler head to remain in a production room (e.g., clean room), mitigating risk of contamination during filling and transportation of bulk containers. For example, the filler head can remain above portions of the bulk container filling and transportation system that may pass through a barrier during operation, preventing debris from beyond the barrier from falling onto or otherwise dirtying the filler head.

In one aspect, embodiments of the present disclosure provide for an adjustable vibration pan, for example, to accommodate for the difference in bag heights. The adjustable vibration pan can be set at heights based on the size of bulk container to be used and/or operator preferences. For example, a vibratory bag pan can be adjusted to reduce the amount of travel required for the filler head, and or to facilitate ergonomic handling of the bulk container (e.g., by operators or other systems).

In one aspect, embodiments of the present disclosure provide for an energy chain for cabling and tubing. For example, an energy chain, which may be referred to as a cable carrier or drag chain, can guide and protect cables and tubing (e.g., tubing for pneumatic components) that are needed to move with machinery.

A method for filling bulk containers can include filling a bulk container in a clean room environment at a first location, transporting the bulk container out of the clean room environment into a non-clean room environment, and disposing of the bulk container in a second location within the non-clean room environment.

In some embodiments, transporting the bulk container out of the clean room environment can include suspending, using a pivoting frame, the bulk container above the ground, and directing the bulk container through an environmental barrier. In some cases, the environmental barrier separates the clean room environment from the non-clean room environment. In some cases, the pivoting frame is configured to rotate about a pivot point having a height less than the height of the bulk container.

In some embodiments, transporting the bulk container out of the clean room environment includes lifting the bulk container from a first surface at the first location and lowering the bulk container in an arcuate path onto a second surface at the second location. The second surface can be, for example, a pallet, a conveyor, or an autonomous robot. In some cases, the arcuate path is defined by rotating about a pivot point at a height lower (e.g., less) than a height of the first surface.

In some embodiments, transporting the bulk container out of the clean room environment is performed by a bulk container handling assembly that includes a pivoting frame. A distal end of the pivoting frame can travel along an arcuate path.

In some embodiments, lifting the bulk container from the first surface at the first location comprises downwardly pivoting the pivoting frame to engage the bulk container in the first location. In some embodiments, lowering the bulk container in an arcuate path onto a second surface at the second location comprises upwardly pivoting the pivoting frame beyond a maximum height and downwardly pivoting the pivoting frame toward the second location.

In some embodiments, the bulk container handling assembly includes an actuator and a linkage mechanism. The actuator can be configured to rotate the pivoting frame about a pivot using the linkage mechanism.

A bulk container handling system can include a base portion located in in a clean room environment, a platform disposed on the base portion, an articulating arm pivotally coupled to the base portion at a first pivot, an actuator coupled to the base portion, and a linkage mechanism separately and pivotally coupled to the base portion, the articulating arm, and the actuator. The platform can be configured to support a bulk container and the articulating arm can be configured to lift the bulk container from the platform. The actuator can be configured to rotate the at least one articulating arm about the first pivot via the linkage mechanism.

In some embodiments, rotating the at least one articulating arm about the first pivot transports a bulk container lifted by the articulating arm to a non-clean room environment. In some embodiments, an environmental barrier separates the clean room environment from the non-clean room environment. Rotating the at least one articulating arm about the first pivot can direct a bulk container lifted by the articulating arm through the environmental barrier.

In some embodiments, the articulating arm is configured to dispose of a bulk container onto a surface in the non-clean room environment. The surface can be, for example, a pallet, a conveyor, or an autonomous robot.

In some embodiments, the height of the first pivot is less than the height of the platform and/or less than the height of a bulk container when lifted by the articulating arm.

In some embodiments, the height of the platform is adjustable relative to the base portion.

In some embodiments, the bulk container handling system includes a carriage coupled to a distal end of the articulating arm, wherein the carriage includes a hook configured to selectively secure a loop of a bulk container. The hook can be slidably coupled to the carriage. In some examples, the carriage can include a locking mechanism configured to selectively prevent slidable movement of the hook.

In some embodiments, the bulk container handling system includes a linear actuator configured to articulate the carriage along a portion of the articulating arm.

In some embodiments, lifting a bulk container from the platform comprises upwardly pivoting the articulating arm beyond a maximum height.

It is to be understood that the foregoing general description and the following detailed description are exemplary and are intended to provide further explanation of the disclosed embodiments. The accompanying drawings, which are incorporated in and constitute part of this specification, are included to illustrate and provide a further understanding of the disclosed methods and systems. Together with the description, the drawings serve to explain principles of the disclosure.

BRIEF DESCRIPTION OF THE DRAWINGS

Subject matter hereof can be more completely understood in consideration of the following detailed description of various embodiments in connection with the accompanying figures.

FIG. 5A is a close-up perspective view of a base portion of a bulk container handling assembly in an upright orientation, in accordance with aspects of the present disclosure.

FIG. 5B is a close-up, left-side plane view of the base portion of the bulk container handling assembly of FIG. 5A in an upright orientation.

Figure 1A:
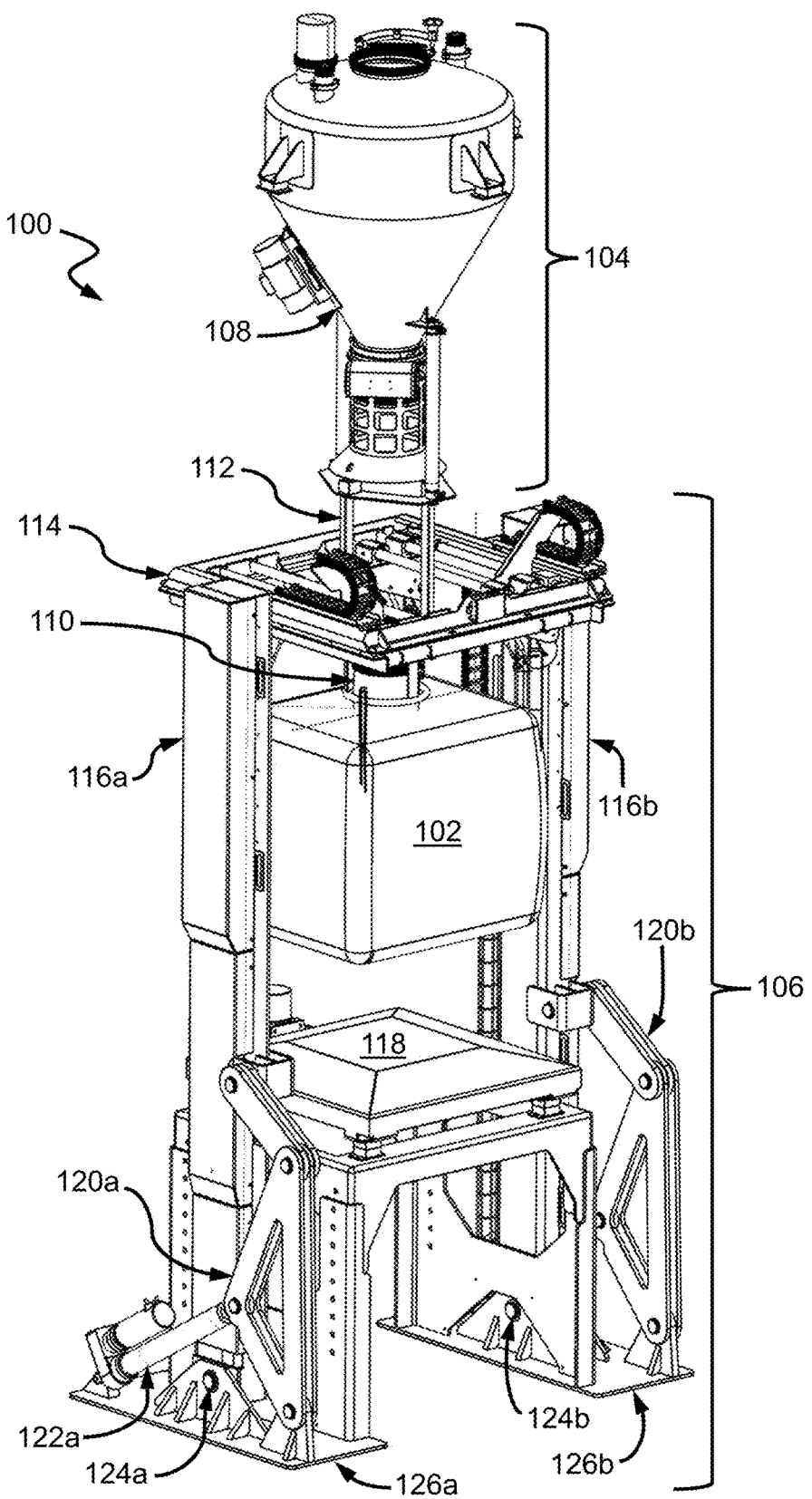
FIGS. 1A-1B are perspective views of a system for filling and transporting a bulk container, in accordance with aspects of the present disclosure.

While various embodiments are amenable to various modifications and alternative forms, specifics thereof have been shown by way of example in the drawings and will be described in detail. It should be understood, however, that the intention is not to limit the claimed inventions to the particular embodiments described.

DETAILED DESCRIPTION

The present disclosure provides examples for floor-based systems and methods of transporting bulk containers. Feature(s) associated with a user-friendly, automated approach to transporting bulk containers, such as bulk bags, are provided that remove a need for overhead I-beams and/or transport rails.

Embodiments of the present disclosure provide for a floor-based system allowing bulk containers to be filled in a first location and quickly moved into a second location. In some embodiments, the floor-based system lift the bulk container in a first location and then pivot the bulk container to a second location (e.g., in another room). For example, a bulk bag can be filled in a clean room and passed through a clean room barrier, such as a curtain, doorway, or portal. In some embodiments, an airlock room can be provided for transfer of products.

Embodiments of the present disclosure offer several advantages over conventional bulk container filling or transportation systems, including reduced system complexity, reduced contamination risk, improved stability, and ease of integration with existing equipment.

Figure 1B:
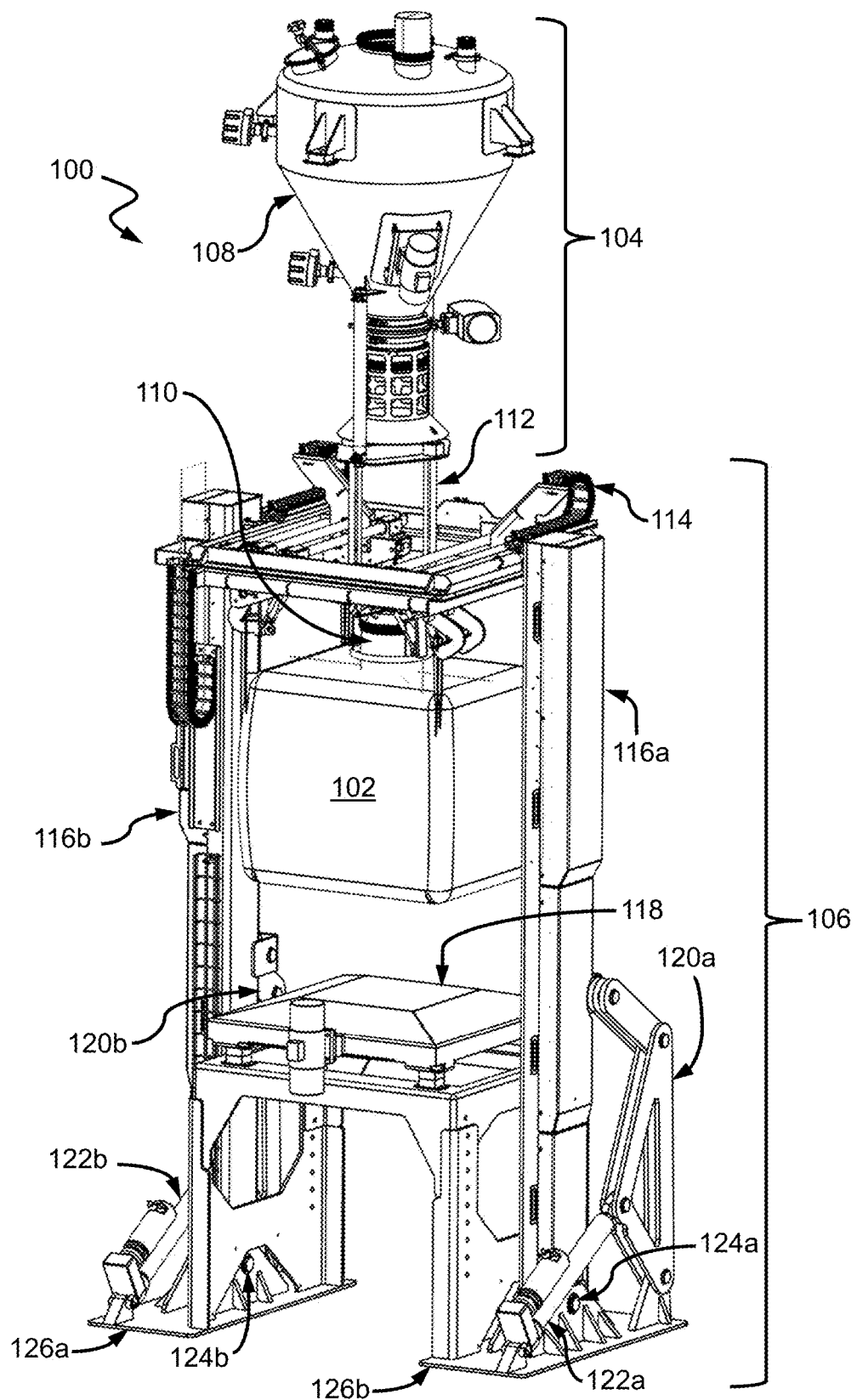

Referring to FIGS. 1A-1B, a perspective view of a system 100 for filing and transporting bulk containers 102 is depicted in a upright orientation, according to an embodiment. System 100 generally includes hopper assembly 104 and bulk container handling assembly 106. System 100 is structured and configured to fill bulk containers 102 using hopper assembly 104 and bulk container handling assembly 106 in a first location, such as a clean room, before transportation to a second location by bulk container handling assembly 106.

Bulk containers 102, which may be referred to as flexible intermediate bulk containers, are often large, flexible woven bags designed for storing and transporting bulk materials. Bulk containers 102 are widely used in various industries, including agriculture, pharmaceuticals, chemicals, and construction, due to their durability, versatility, and cost-effectiveness. Depending on use case, bulk containers 102 can be made of plain-woven polypropylene, antistatic or static-dissipative fabric, or include ventilation strips. Food-grade bulk containers 102 can be made of, for example, virgin polypropylene resin and manufactured in clean rooms.

Bulk containers 102 generally include loops, sports, and/or liners. Loops (e.g., four corner loops) are used for lifting the bag, for example, with a carriage, forklift, or crane. Spouts can include top spouts for filling and bottom spouts for discharge. In some implementations, variations may include duffle tops and flat or cone-shaped bottoms. Liners (e.g., inner liners) are optional and can be used for extra protection against moisture or contamination.

In some embodiments, bulk containers 102 are bulk bags. For example, bulk container 102 can be a 1200-pound bulk bag (e.g., 32 ft3). For example, bulk container 102 can be a 1400-pound bulk bag (e.g., 40 ft3). For example, bulk container 102 can be a 2000-pound bulk bag (e.g., 58 ft3).

Hopper assembly 104 is structured and configured to dispense materials to a bulk container 102 held by bulk bag handling assembly 106. Hopper assembly 104 generally includes hopper 108, filler head 110, and frame 112. Hopper assembly 104 receives a supply of material at hopper 108 and distributes the material to bulk container 102 via filler head 110. In some implementations, hopper assembly 104 is fixedly positioned and arranged, for example, within a first location, such as a cleanroom. Hopper assembly 104 can be independent (e.g., separate) from bulk container handling assembly 106.

In some embodiments, filler head 110 is retractable along frame 112 such that filler head 110 can extend toward (e.g., into) bulk container 102 during a filling cycle and retract when not in a filling cycle. Actuation of filler head 110 along frame 112 can be achieved using pneumatic, hydraulic, or mechanical systems. A retractable filler head 110 allows the hopper assembly 104 to remain in the first location (e.g., a clean production room) while bulk container handling assembly 106 transports bulk containers 102. By keeping hopper assembly 104 within a production room (e.g., separate from handling bulk container 102), the risk of contamination is reduced. In some implementations, a retractable filler head 110 can be used to automate the connection and disconnection processes, reducing the risk of operator error and reducing downtime.

In some embodiments, hopper assembly 104 includes monitoring capabilities. Hopper assembly 104 can include one or more of a load cell, a level indicator, an actuator, a vibration sensor, or a vibration isolator. For example, capacitance can be monitored to determine a level of product within hopper 108.

Bulk bag handling assembly 106 is structured and configured to handle bulk containers 102 during a filling cycle in a first location, such as a clean room, and to efficiently move the container into a second location (e.g., an airlock room) once filled. In some implementations, bulk bag handling assembly 106 can move bulk container 102 through a barrier, such as a curtain, doorway, or portal. Bulk bag handling assembly 106 includes a carriage 114, arms 116, a container pan 118, linkage mechanisms 120, and actuators 122.

Carriage 114 is supported by arms 116a, 116b and configured to selectively couple bulk container 102. For example, carriage 114 can include auto bag hooks for hooking loops of a bulk bag placed on bag pan 118. Attachment mechanisms, such as bag hooks, can be coupled to a pneumatic system. A (e.g., each) attachment mechanism can include a sensor, such as a proximity sensor, that can be used to determine whether the attachment mechanism has been properly engaged or disengaged. Attachment mechanisms, such as bag hooks, can be manually operated by a user or automatically controlled (e.g., based on monitored data). In some embodiments, carriage 114 can determine the presence and fill status of bulk container 102 via sensor(s). For example, carriage 114 can include a weight transducer configured to determine a load placed on a (e.g., each) attachment mechanism.

Arms 116a, 116b are configured to move (e.g., raise and lower) carriage 114. For example, arms 116a, 116 can be pneumatic lifting arms including linear bearings and/or rollers. In some embodiments, movement of carriage 114 is along an axis parallel to the length of arms 116a, 116b.

Container pan 118 is structured to support bulk container 102 during a fill cycle. For example, container pan 118 can be an inverted adjustable vibratory bag pan fixed between arms 116a, 116b. Container pan 118 (e.g., a frame of container pan 118) and arms 116a, 116b can be disposed (e.g., fixedly coupled) to bases 126a, 126b. In some embodiments, Container pan 118 (e.g., a frame of container pan 118) and arms 116a, 116 can share a common base 126.

In some embodiments, container pan 118 is adjustable such that container pan 118 can be set to different heights, for example, based on the height of bulk container 102. Adjusting the height of container pan 118 can reduce the amount of travel required for filler head 110 and/or improve accessibility to an operator.

In some embodiments, container pan 118 is a vibratory bag pan configured to distribute material within bulk container 102 through vibrations (e.g., during a filling cycle). Vibration control (e.g., frequency and amplitude) can be selected, for example, based on materials to facilitate a constant material flow from hopper assembly 104 to bulk container handling assembly 106. For example, vibratory action can prevent material bridging and blockages.

Linkage mechanisms 120a, 120b and actuators 122a, 122b are coupled to arms 116a, 116b and configured to convert bulk container handling assembly 106 between a upright orientation, as shown in FIGS. 1A-1B, and a leaning orientation. When switching from a upright orientation to a leaning orientation, arms 116a, 116b can lift bulk container 102 off of container pan 118 to establish clearance. Actuators 122a, 122b can extend (e.g., then) pivoting arms 116a, 116b about base hinges 124a, 124b.

In some embodiments, bulk bad handling assembly 106 can include sensor(s) to facilitate automated filling cycles. For example, filler head 110 can be lowered based on data captured from proximity sensors of carriage 114. For example, filler head 110 can be raised based on weight sensed by carriage 114 and/or bag pan 118. In some embodiments, indications of automated events and/or monitored data can be provided to an operator via a graphical user interface (GUI).

In some embodiments, bulk bag handling assembly 106 is chemically compatible with wash-down fluid such that exposed surfaces can be cleaned through a caustic wash-down to maintain sanitary conditions. For example, component(s) of bulk bag handling assembly 106 can comprise stainless steel.

In some embodiments, bulk bag handling assembly 106 is configured to integrate seamlessly with various discharge systems, such as hopper assemblies, providing a versatile solution for material transfer. For example, bulk bag handling assembly 106 can be adapted to different types of hoppers (e.g., cone-shaped, flat-bottomed, or custom-designed) and/or filler heads.

Figure 2A:
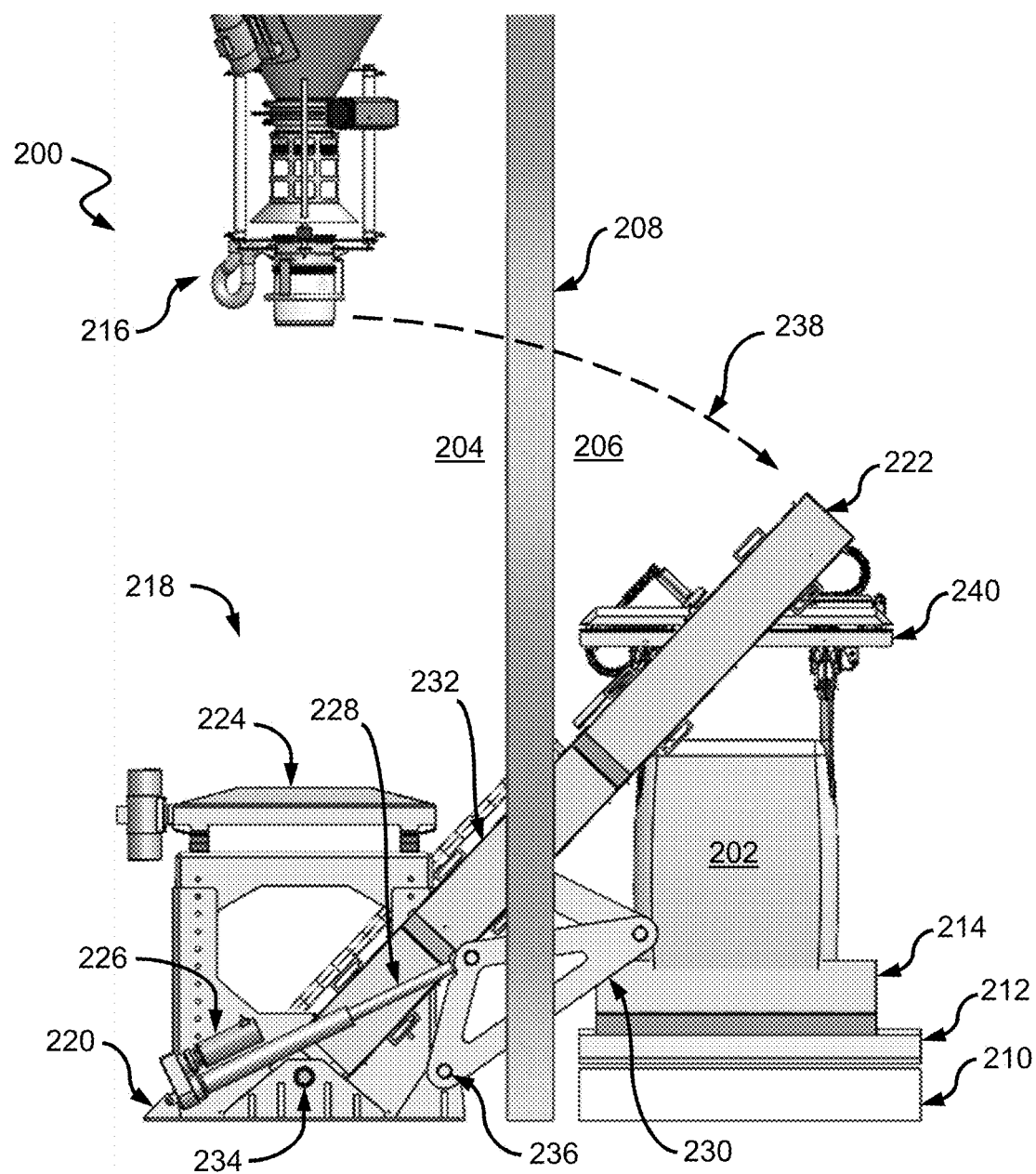
FIG. 2A, is a right-side plane view of a system for filling and transporting a bulk container, in accordance with aspects of the present disclosure.
Figure 2B:
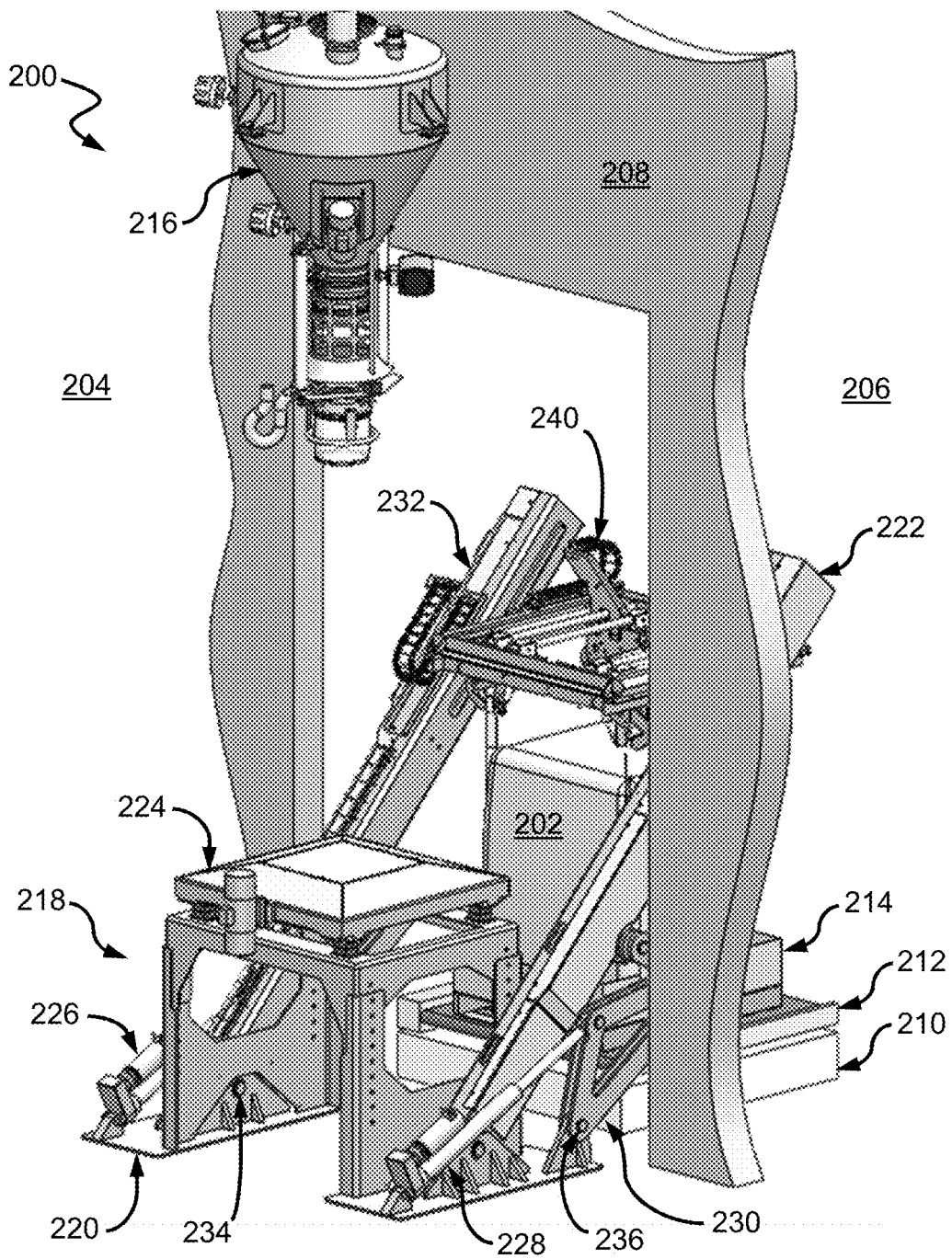
FIG. 2B, is a perspective view of the system for filling and transporting a bulk container of FIG. 2A.

Referring to FIGS. 2A-2B, a system 200 for filling and transporting a bulk container 202 is depicted in a leaning orientation, according to an embodiment. System 200 can be used to move bulk container 202 between a first location 204 and a second location 206, which can be separated by a barrier 208.

In some cases, first location 204 can be a controlled environment, such as a clean room designed to maintain extremely low levels of particulates, such as dust, airborne microbes, aerosol particles, and chemical vapors.

In some cases, second location 206 can be an airlock chamber or a designated manufacturing or packaging area within a facility (e.g., where products are assembled, processed, and packaged). Second location 206 can include, for example, platform 210, conveyor 212, and pallet 214. In some embodiments, second location 206 can include one or more of a forklift, a pallet jack, a crane, a hoist, a roller conveyor, a belt conveyor, a transport cart, autonomous robot, or other transportation mechanisms (e.g., for further handling or storage of bulk container 202).

In some cases, barrier 208 can be a physical partition separating a clean room environment from adjacent areas to mitigate contamination. For example, barrier 208 can be a soft-wall barrier (e.g., a curtain) or a pass-through compartment within a wall. Barrier 208 can be used to prevent contaminants from migrating between first location 204 and second location 206. In some embodiments, a portion of barrier 208, such as a door can be automatically controlled, for example, when system 200 transitions from a upright orientation to a leaning orientation.

System 200 includes hopper assembly 216 and bulk bag handling assembly 218. Hopper assembly 216 can be any discharge system configured to supply material to bulk container 202 when bulk bag handling assembly 218 is in a upright orientation. Bulk bag handling assembly 218 includes a base portion 220 and top portion 222.

As illustrated, base portion 220 includes platform 224, motor 226, actuator 228, and linkage mechanism 230, and a portion of at least one articulating arm 232 (e.g., illustrated herein as two arms on either side of platform 224). Platform 224 is configured to support bulk container 202 when in a fill position. At least one articulating arm 232 is pivotally coupled to base portion 220 (e.g., directly) at a first pivot 234 and (e.g., indirectly) at a second pivot 236 via linkage mechanism 230.

In some embodiments, for example as illustrated, linkage mechanism 230 is a four-bar mechanism. A four-bar mechanism can provide greater mechanical advantage, for example, compared to an articulating drive rotatably coupled directly to an articulating arm. Moreover, use of linkage mechanism 230 conserves space (e.g., through a relatively limited operating envelope) and reduces total amount of length required for actuator 228.

In operation, bulk bag handling assembly 218 is operable to transition from a upright orientation to a leaning orientation. Motor 226 extends actuator 228, causing outward extension of linkage mechanism 230 from base portion 220 and thereby rotation of articulating arm 232 about first pivot 234. When transitioning from a upright orientation to a leaning orientation, at least one articulating arm 232 lifts bulk container 202 from a raised position over platform 224 along a loading path 238. In the leaning orientation, top portion 222 of bulk bag handling assembly 216, including carriage 240, is positioned to release bulk container 202 onto pallet 214, for example for, subsequent transportation via conveyor 212.

The leaning orientation of system 200 allows hopper assembly 216 and base portion 220 of bulk bag handling assembly 218 to remain in the first location 206. In situations where first location 206 is a clean room, minimizing components that cross barrier 208 and leave the clean room during transportation of bulk containers reduces the risk of contamination. This reduced risk of contamination can reduce the frequency and intensity of cleaning, decontamination, and maintenance procedures, saving time and operational costs while ensuring product quality and compliance with regulatory standards.

In some embodiments, the distance and height that system 200 can place a bulk container 202 into the second location 206 can depend on the length of the at least one articulating arm 238. In some implementations, bulk container handling assembly 218 can place bulk container 202 6 feet into the second location 206 (e.g., when base portion 220 is adjacent to barrier 208. In some implementations, bulk container handling assembly 218 can place bulk container 202 into a 9-inch-tall box on platform 210.

Figure 3A:
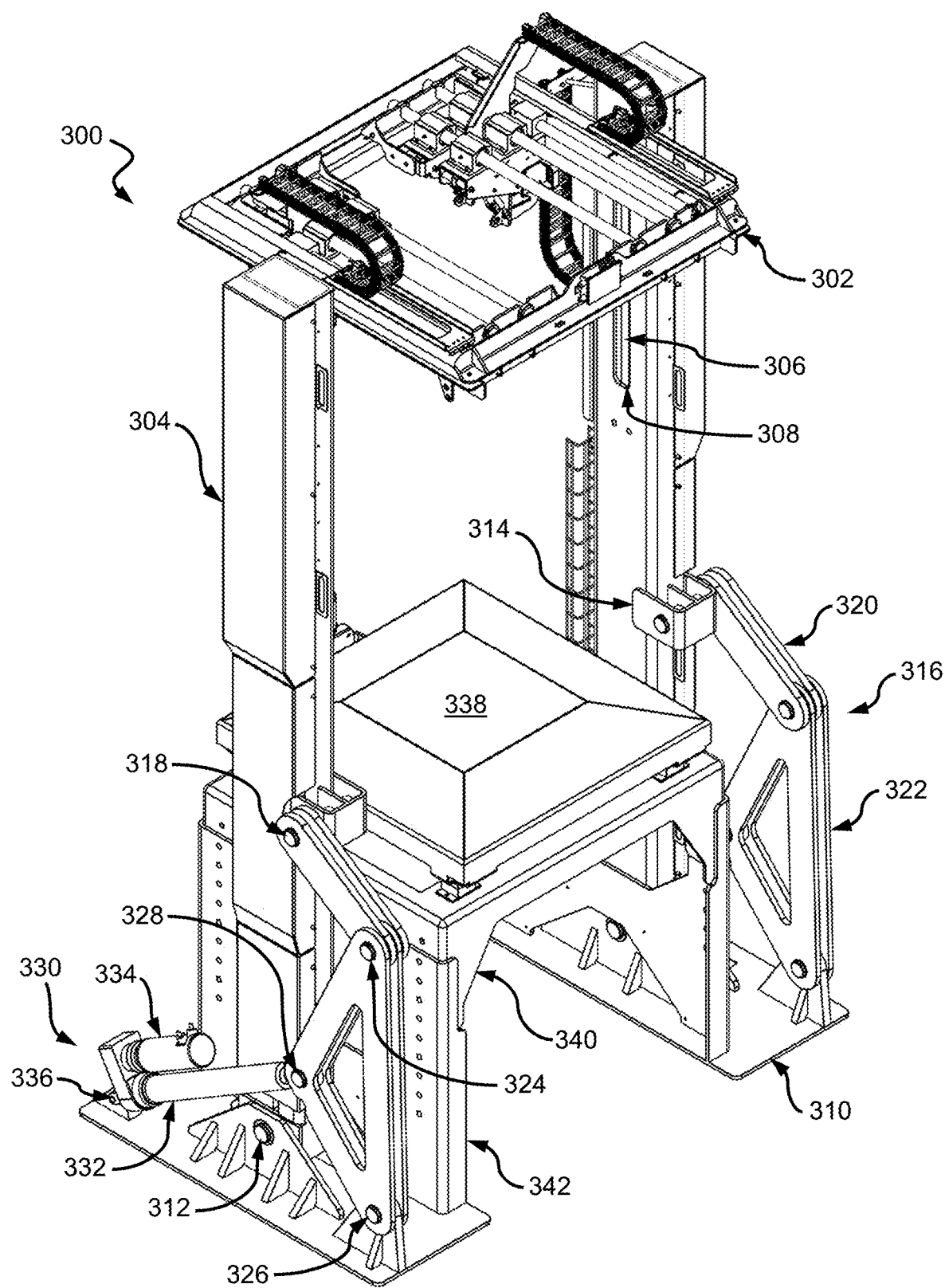
FIG. 3A-3B are perspective views of a bulk container handling assembly in an upright orientation, in accordance with aspects of the present disclosure.
Figure 3B:
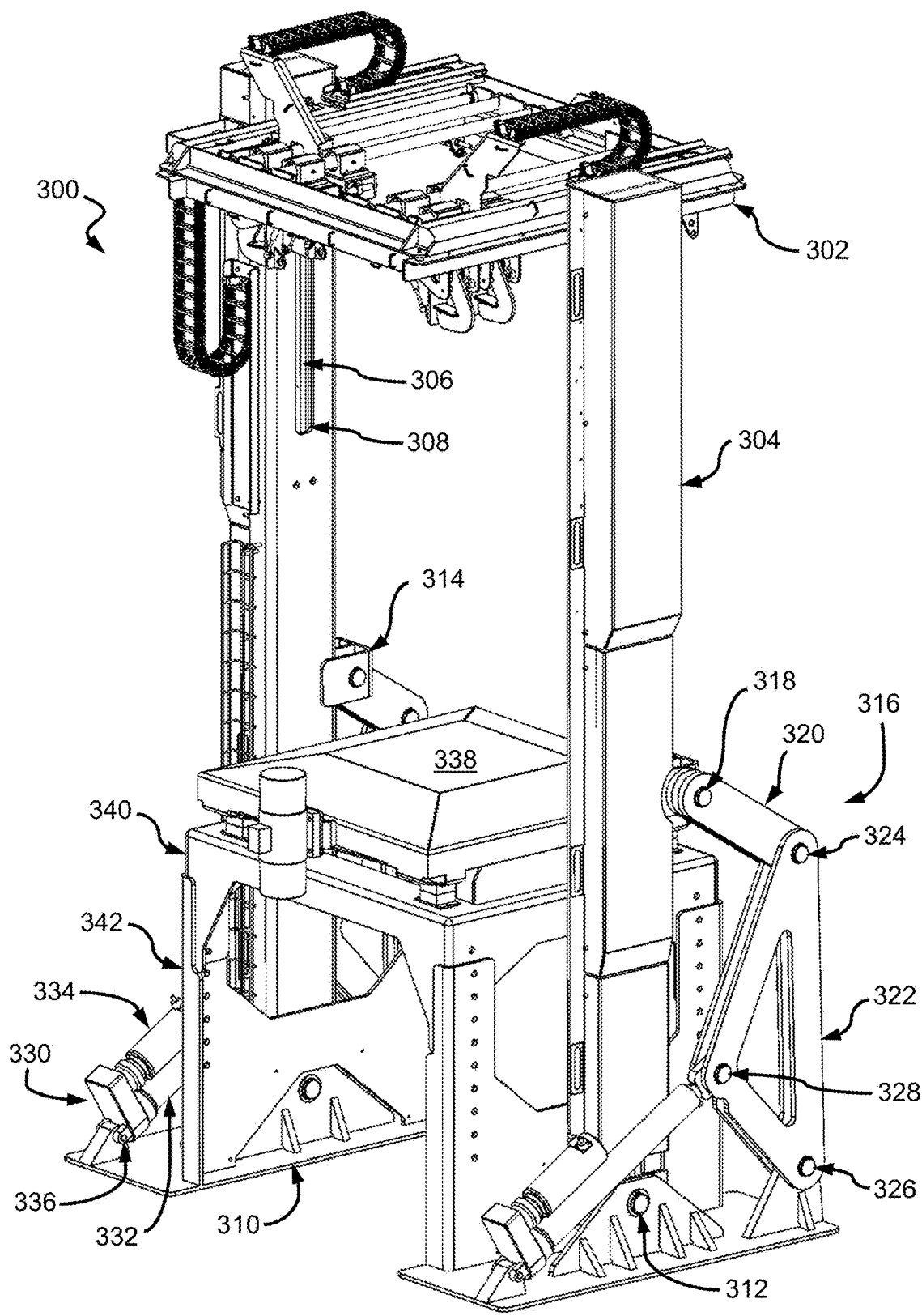
Figure 3C:
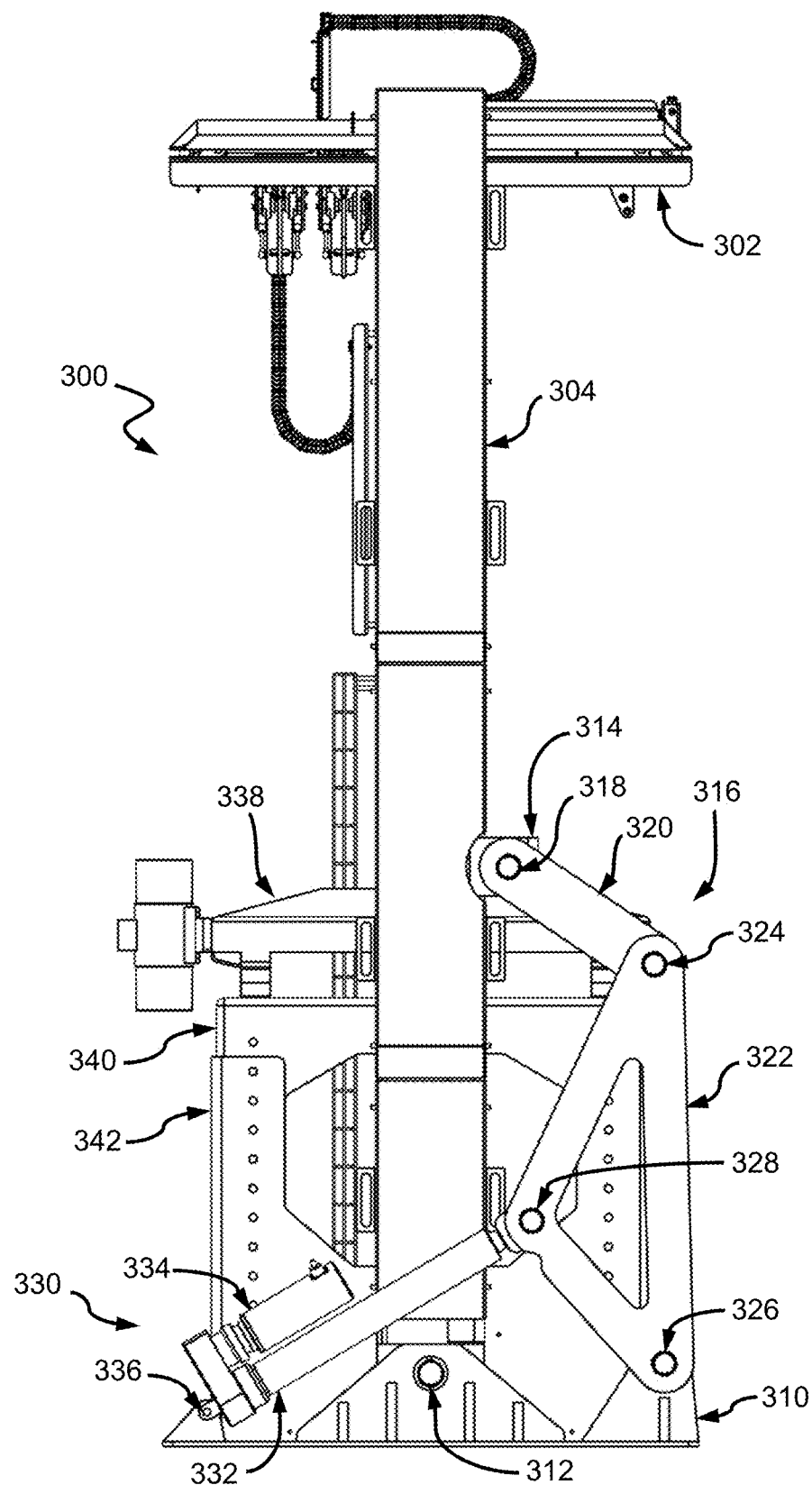
FIG. 3C is a right-side plane view of the bulk container handling assembly of FIG. 3A in an upright orientation.
Figure 4A:
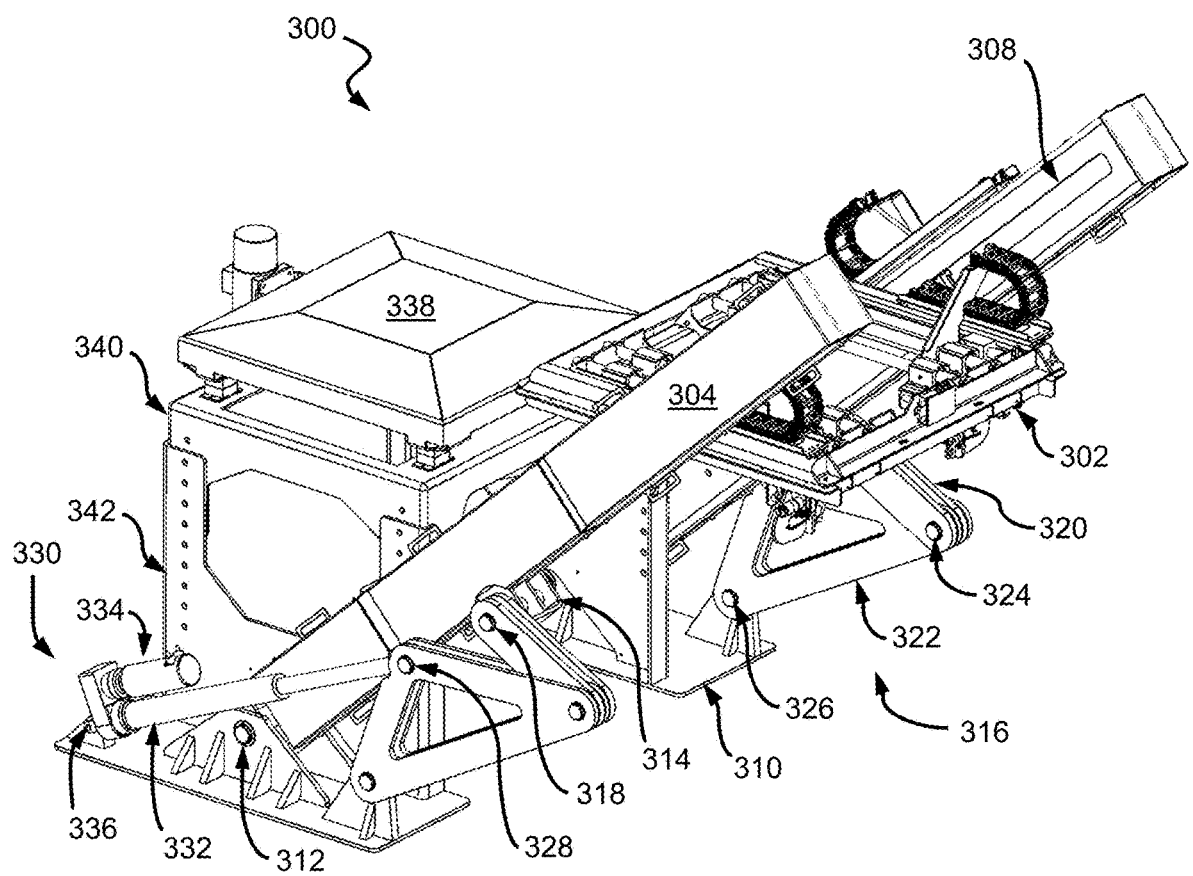
FIG. 4A-4B are perspective views of the bulk container handling assembly of FIG. 3A in a leaning orientation.
Figure 4B:
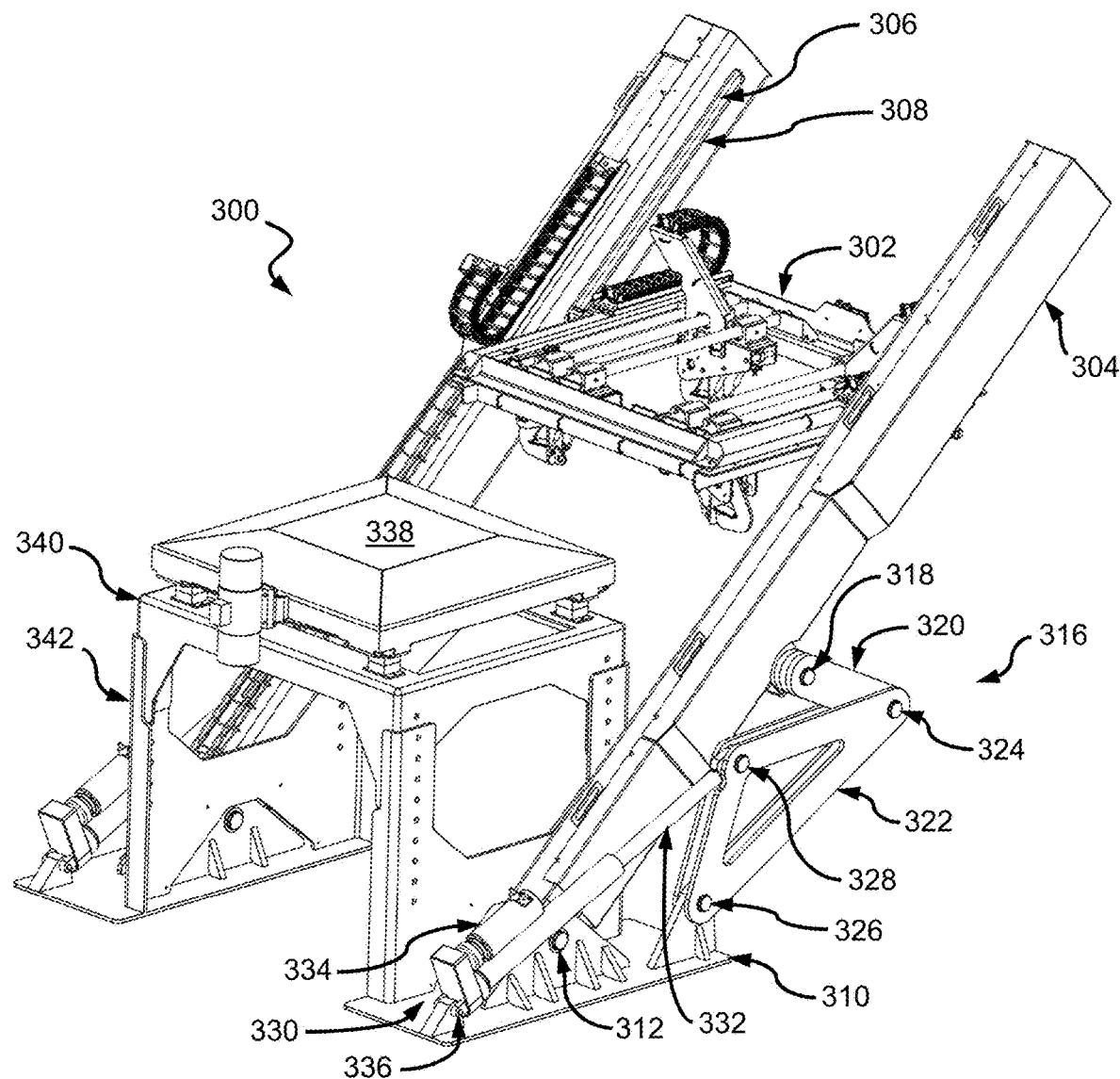
Figure 4C:
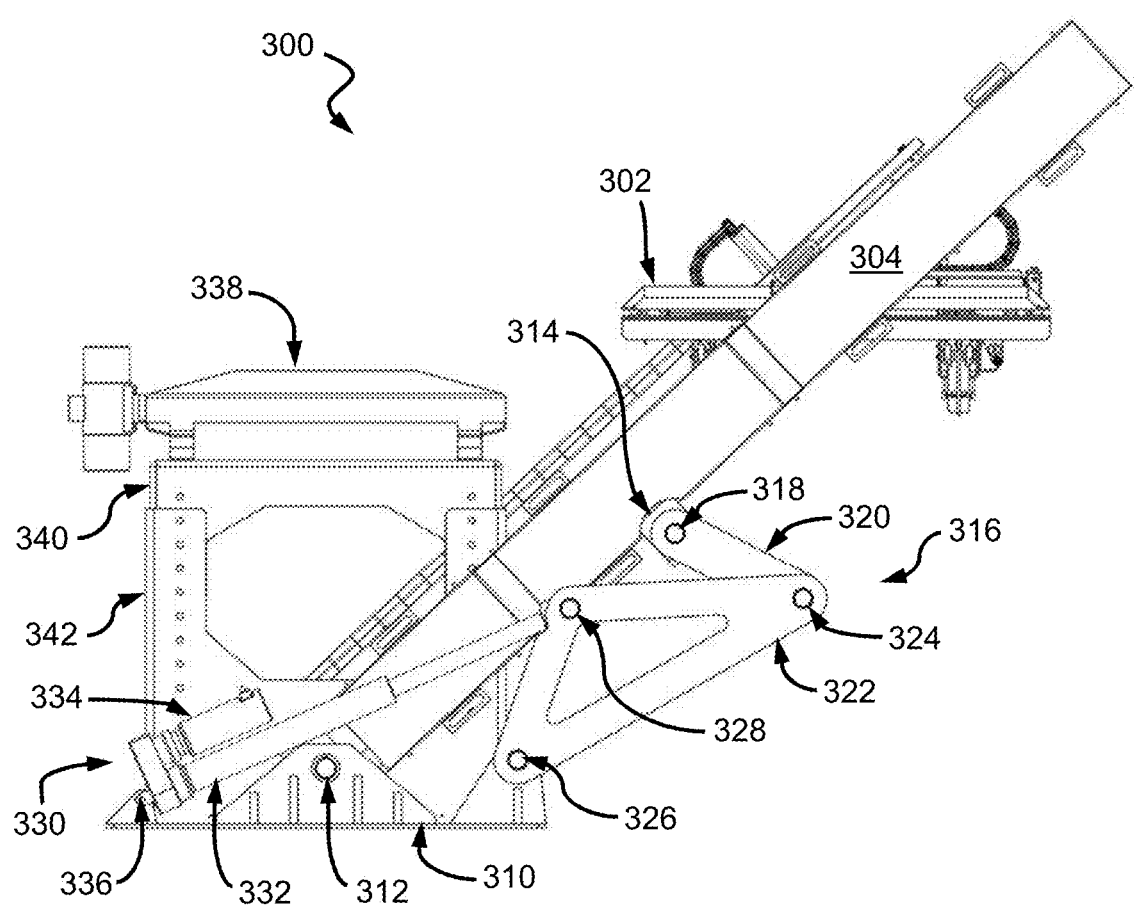
FIG. 4C is a right-side plane view of the bulk container handling assembly of FIG. 3A in a leaning orientation.

Referring to FIGS. 3A-3C, various views of a bulk container handling assembly 300 in an upright orientation are illustrated, according to an embodiment. FIGS. 4A-4C illustrate various views of bulk container handling assembly 300 in a leaning orientation.

Bulk container handling assembly 300 is configured to support a bulk container during a filling cycle when in the upright orientation. Once the bulk container is filled, bulk container handling assembly 300 is configured to lower the bulk container about a pivot (e.g., in an arc) to arrive at the leaning orientation. Bulk container handling assembly 300 is configured to release the full bulk container while in the leaning orientation.

Bulk container handling assembly 300 includes a base 310 separately and pivotably coupled to an arm 304, a linkage mechanism 316, and an actuator 330 (e.g., illustrated herein as two similarly arranged arms). Arm 304, a linkage mechanism 316, and an actuator 330 (including components 332, 334) further include a series of pivots to support rotation of arm 304 when moving a bulk container.

As illustrated, arm 304 is pivotally coupled to base 310 via an arm-to-base pivot 312 and to linkage mechanism 316 via a linkage-to-arm pivot 318 on arm protrusion 314. Linkage mechanism 316 includes a triangle support 322 and a straight support 320 that are pivotably coupled (e.g., to one another) via a linkage pivot 324. Triangle support 322 is (e.g., further) pivotably coupled to base 310 via a linkage-to-base pivot 326 and to actuator 330 via an actuator-to-linkage pivot 328. Straight support 320 is (e.g., further) pivotably coupled to arm 304 via the linkage-to-arm pivot 318. Actuator 330 is pivotably coupled to base 310 via an actuator-to-base pivot 336 and to linkage mechanism 316 via the actuator-to-linkage pivot 328.

Actuator 330 is configured to articulate arm 304 about arm-to-base pivot 312 via linkage mechanism 316. Arm 304 can be configured to lift a bulk container along a loading/unloading path (such as but not limited to an arcuate path, as shown in FIG. 2A) that is at least partially vertical.

Arm 304 is coupled to a carriage 302 being configured to removably hook a bulk container. In some embodiments, the outer housing of arm 304 can surround and define an inner cavity that houses a linear actuator 306. An inwardly facing side of arm 304 (e.g., a portion of outer housing facing toward platform 338) can define a channel 308 along a portion of the length of arm 304. An end of linear actuator 306 can be coupled to carriage 302 permitting automated movement of carriage 302 (e.g., along arm 304). For example, as shown in FIGS. 3A-3C carriage 302 can be positioned at a distal end of channel 308 (e.g., relative to base 310). For example, as shown in FIGS. 4A-4C, carriage 302 can be positioned at a proximal end of channel 308 (e.g., relative to base 310).

In some embodiments, linear actuator 306 is one of a mechanical actuator, a hydraulic actuator, a pneumatic actuator, or an electric actuator. For example, linear actuator can be a pneumatic actuator incorporating bearings. Linear bearings, which can include ball bearings or sliding mechanisms, can offer low friction, precise motion control along channel 308 (e.g., compared to rollers). In some embodiments, linear actuator has a total stroke of 40.5 inches.

In some embodiments, base 310 includes a protrusion 342 configured to selectively couple platform frame 340 to support platform 338. In embodiments, platform frame 340 can be fastened to protrusions 342 at various heights, for example, such that the height of platform 338 can be selected based on the size (e.g., height) of bulk container to be handled.

In operation, bulk container handling assembly 300 comprises an arm 304 supporting a carriage 302 configured to removably hook a bulk container in an upright position during the filling cycle. During the filling process, the articulating arm maintains the bulk container's stability and alignment with the filling apparatus. Upon completion of the filling cycle, the assembly utilizes an actuator to initiate movement of the articulating arm. A compact linkage mechanism, which is connected to both the articulating arm and the base of the assembly, facilitates this movement. The articulating arm rotates around a low pivot point located near the ground at the base of the assembly. This rotation allows the filled bulk container to be transferred to a second location. The linkage mechanism and actuator are configured to manage the weight of the filled bulk container throughout the movement process. This design optimizes handling efficiency, maintains stability during transport, and minimizes contamination risks, making it suitable for use in various industrial applications, including but not limited to pharmaceuticals, food processing, and chemical handling.

The position of arm-to-base pivot 312 facilitates a low, near-ground pivot point. A low pivot point lowers the center of gravity of the system during the lifting and transport process, which can reduce both the risk of imbalance and mechanical stress on arm 304. Linkage mechanism 316 provides additional flexibility and control over the lifting process through linkage-to-arm pivot 318. The dual-pivot mechanism of arm 304 facilitates smooth and stable lifting of a bulk container while maintaining a compact profile. This stability is crucial when handling heavy containers, particularly when operators are nearby.

Figure 6A:
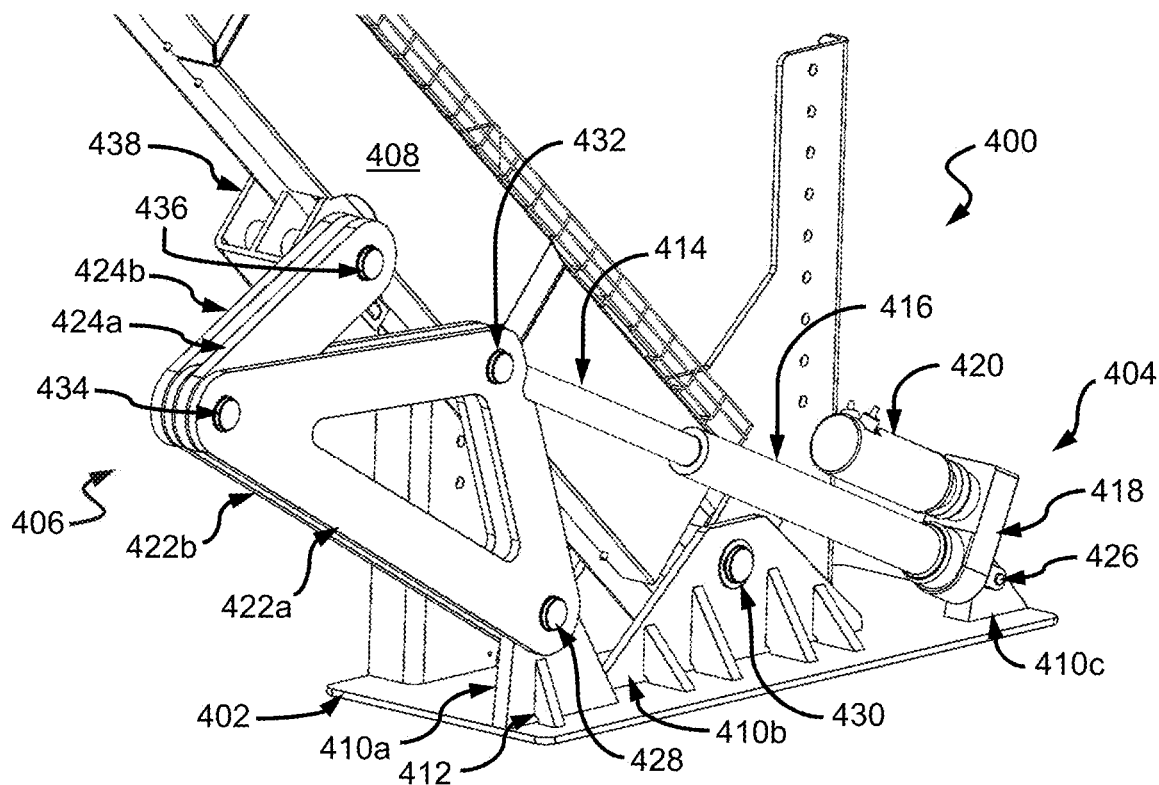
FIG. 6A is a close-up perspective view of the base portion of the bulk container handling assembly of FIG. 5A in a leaning orientation.
Figure 6B:
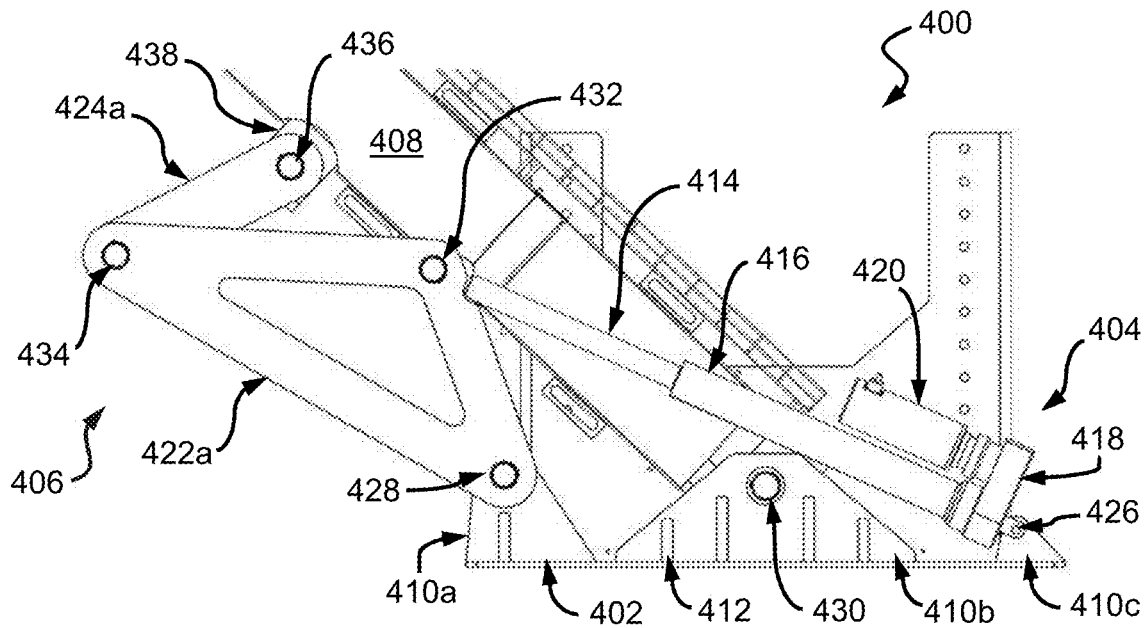
FIG. 6B is a close-up, left-side plane view of the base portion of the bulk container handling assembly of FIG. 5A in a leaning orientation.

Referring to FIGS. 5A-5B, close-up views of a base portion 400 of a bulk container handling assembly in an upright orientation are illustrated, according to an embodiment. FIGS. 6A-6B illustrate close-up views of base portion 400 in a leaning orientation.

Base portion 400 includes base 402 having protrusions 410a, 410b, 410c that are pivotally coupled to an actuator 404, a linkage assembly 406, and an arm 408 respectively. A (e.g., each) protrusion 410 can include one or more flanges 412 to improve weight distribution and stability along base 402. In some embodiments, a protrusion 410c can include a bolt flange for pivotally receiving a lower end of the actuator 404. In some embodiments, base 402 can be welded to the floor.

Actuator 404 includes a longitudinally extending drive 414 that includes a stationary tubular housing 416 attached at a lower end to gearbox 418 and motor 420. Motor 420 can be an electric motor that is coupled to a control system, described in detail below. Motor 420 generates torque through an output shaft when actuated that drives an internal drive screw or power screw situated within housing 416. The drive screw/power screw is directly or indirectly attached or extending drive 414 that is coupled by way of arm protrusion 422 to arm 408. Thus, when motor 420 is turned on, the power screw in housing 416 rotates, shortening (e.g., as shown in FIGS. 5A-5B) or lengthening (e.g., as shown in FIGS. 6A-6B) the distance between the upper and lower pivoted connections of actuator 404. In some embodiments, actuator 404 is one of an electric power screw actuator, a hydraulic actuator, or a pneumatic actuator.

In some embodiments, actuator 404 can incorporate a detector (e.g., magnetic, optical, or electrical) for counting the number of revolutions of the drive unit. The signal generated by the detector can be routed to a controller, for example to maintain balance of the load.

Linkage mechanism 406 is an assembly of pivots and supports between base 402, actuator 404, and arm 408 that are configured to provide structural support. Linkage mechanism 406 generally includes triangle support 422 and straight support 424.

Triangle support 422 and/or straight support 424 can (e.g., each) include two or more parallel plates (e.g., 422a, 422b and 424a, 242b respectively). A (e.g., each) plate includes openings for receiving pivot pins to facilitate connections to corresponding openings defined in base 402, actuator 404, and arm 408.

Base portion 400 incorporates a plurality of pivots that facilitate rotation of arm 408 relative to base 402, including: actuator-to-base pivot 426, linkage-to-base pivot 428, arm-to-base pivot 430, actuator-to-linkage pivot 432, linkage pivot 434 (e.g., between triangle support 422 and straight support 424), and linkage-to-arm pivot 436. A (e.g., each) pivot can include a hinge pivot pin inserted through corresponding openings, for example with retainer rings and/or washers. A (e.g., each) pivot can be formed form a sandwich of components including a plurality of plate portions. For example, linkage pivot can include a hinge pivot pin inserted through triangle support 422a, 422b; straight support 424a, 424b; and retainer ring(s). For example, linkage-to-arm pivot 436 can include a hinge pivot pin inserted through straight support 424a, 424b; multiple plates of arm protrusion 438; and retainer ring(s). It will be recognized that other configurations of hinges and/or pins fall within the scope of the disclosure.

Figure 7A:
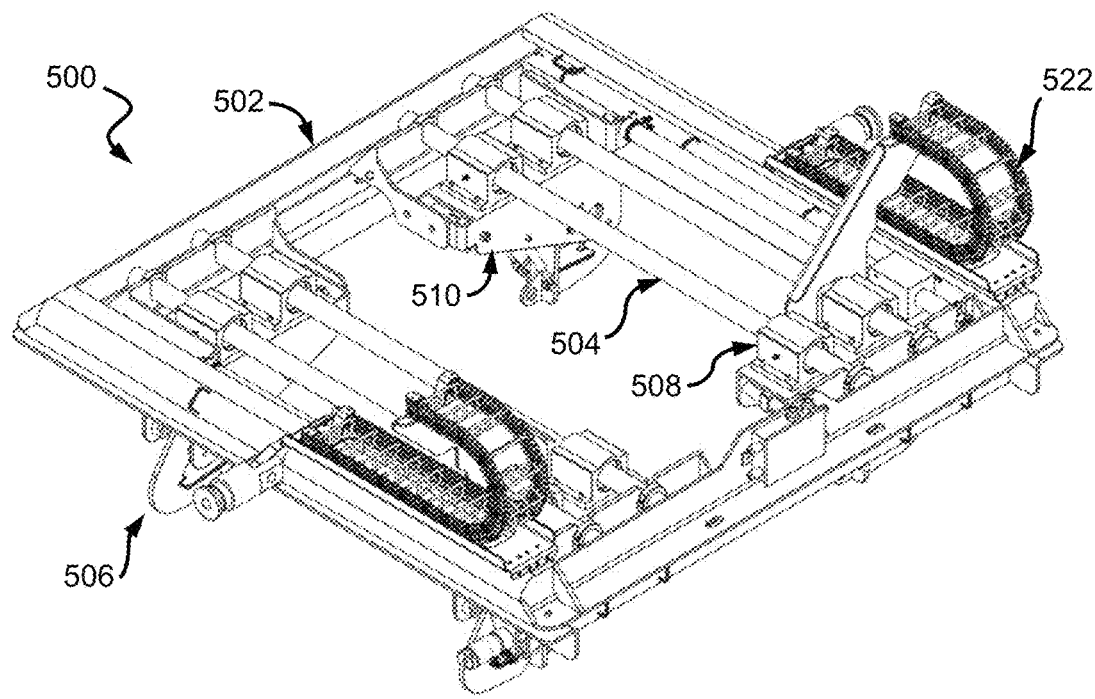
FIG. 7A is a top-down perspective view of a carriage, in accordance with aspects of the present disclosure.
Figure 7B:
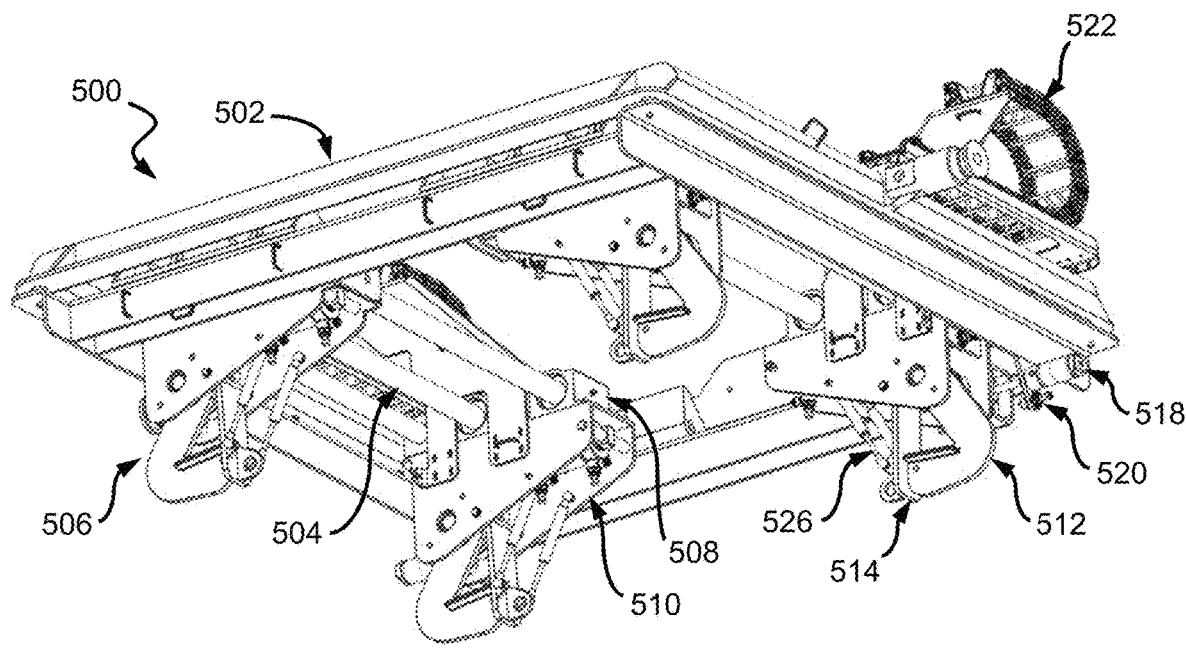
FIG. 7B is a bottom-up perspective view of the carriage of FIG. 7A.
Figure 8A:
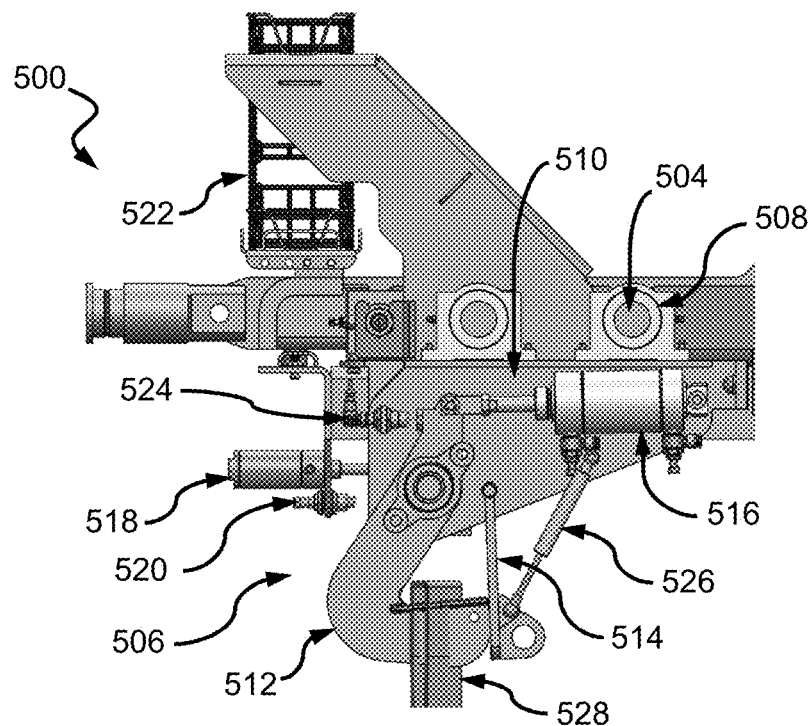
FIG. 8A is a left-side transected plane view of the carriage of FIG. 7A in a closed configuration.
Figure 8B:
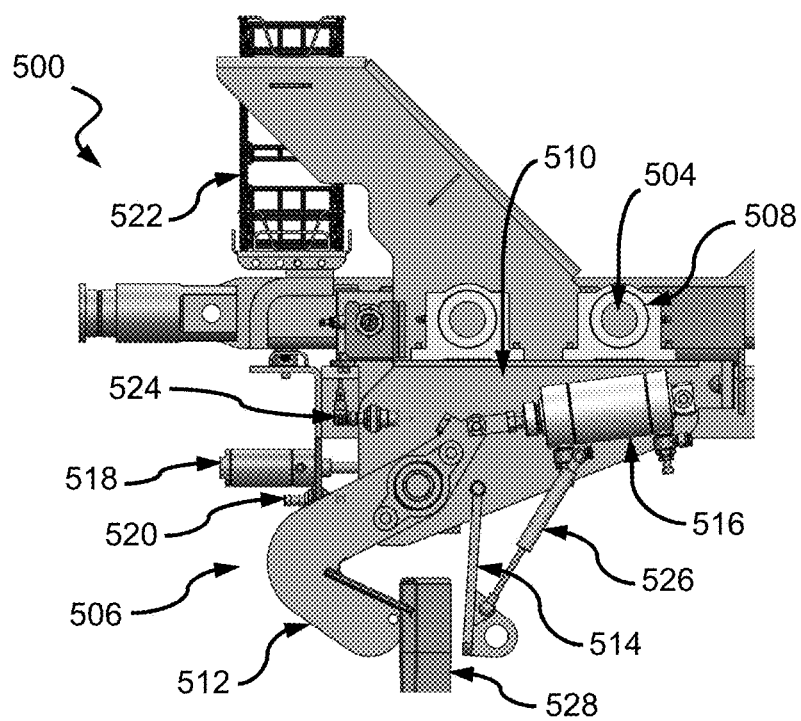
FIG. 8B is a left-side transected plane view of the carriage of FIG. 7A in an open configuration.
Figure 9A:
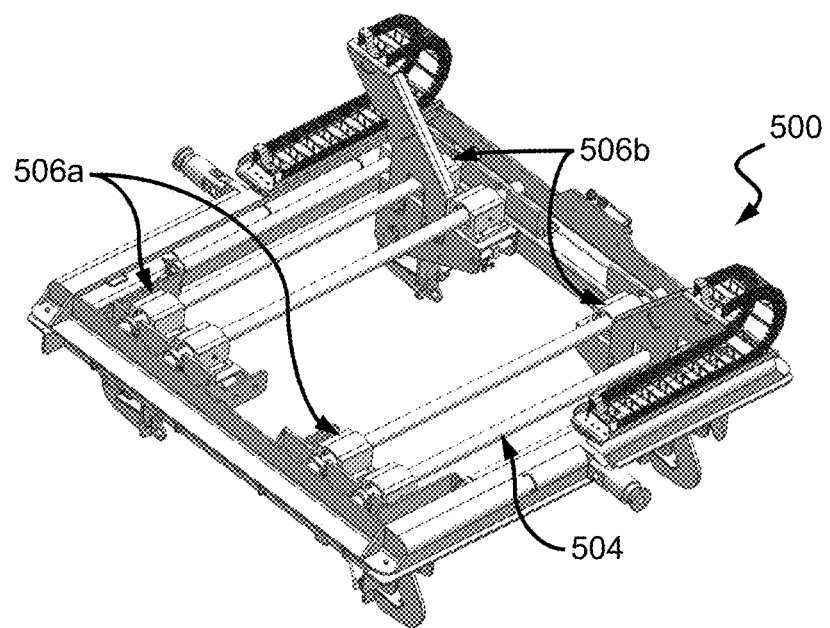
FIGS. 9A-9B are top-down perspective views of the carriage of FIG. 7A.
Figure 9B:
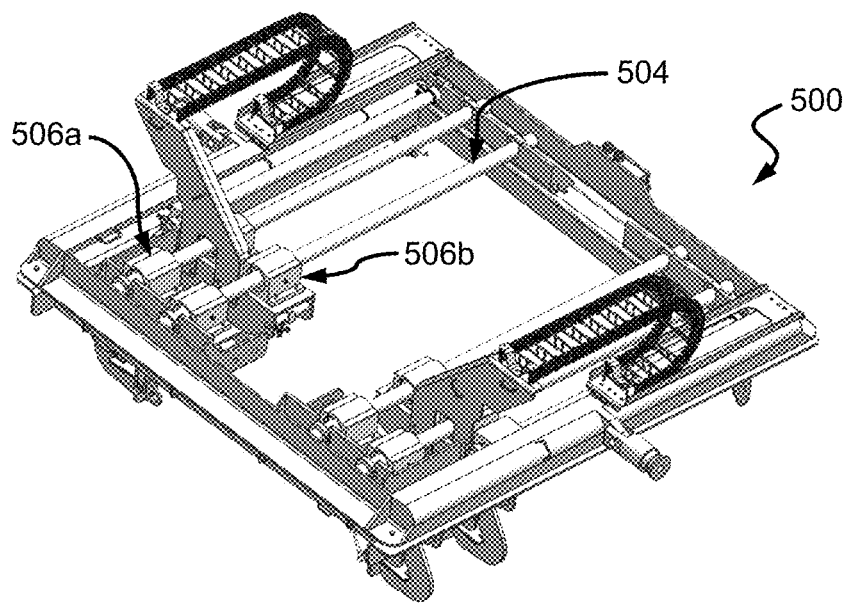

FIGS. 7A-7B depict perspective views of a carriage 500 of a bulk container handling assembly, according to an embodiment. FIGS. 8A-8B depict transected, partial views of carriage 500. FIGS. 9A-9B depict perspective views of carriage 500 in different configurations.

Carriage 500 is configured to automatically detect and hook loops of a bulk container. Carriage 500 includes a frame 502 defining an interior opening. Frame 502 supports shafts 504 that span the interior of frame 502 and support bag hooks 506.

A (e.g., each) bag hook 506 generally includes linear bearing(s) 508, a mount 510, a hook 512, a retention plate 514, and an actuator 516. Linear bearings 508 can be positioned above mount 510 which can partially surround and couple to hook 512, retention plate 514 and actuator 516. Retention plate 514 can be biased or include to gas springs 526 to ensure a bulk container loop remains on hook 512. In implementations incorporating gas springs 526, the gas springs can be set to a sufficiently low force to allow an operator to pull the retention plate back, for example, to manually hook or unhook a bulk container loop 528. In some embodiments, bag hooks 506 can include a proximity sensor 524 to detect whether hook 512 and retention plate 514 are properly engaged or disengaged (e.g., by actuator 516).

Actuator 516 can be configured to move bag hook 506 along shafts 504 using linear bearings 508. In some embodiments, actuator 516 is a pneumatic actuator. In such embodiments, all bag hooks 506 can be connected to the same pneumatic circuit.

In some embodiments, bag hooks 506 are configured to move along shafts 504, for example, so that all bag hooks 506 can be brought to a common side (e.g., for ease of access by an operator), as shown in FIG. 9B. When not needed on a common side (e.g., once the operator is finished or in instances where the bulk container is automatically hooked) bag hooks 506 can return to a default filling position, as shown in FIG. 9A.

In some implementations a first set of bag hooks 506a can be locked (e.g., bolted) to a front side of carriage 500 and a second set of bag hooks 506b can selectively retract along corresponding shafts 504 (e.g., via linear bearings 508). With reference to FIGS. 8A-8B, a locking cylinder 518 can be used to prevent unintended movement of a bulk container during a filling cycle. For example, a proximity sensor 520 can be used to detect the position of a bag hook 506b to automatically engage locking cylinder 518.

In some embodiments, tubing or wiring associated with elements of carriage 500, such as actuators 516 and proximity sensors 524, can be routed through energy chains 522. Energy chains 522 can provide for advantages including abrasion prevention, environmental shielding, reduced cable stress and fatigue, elimination of loose cables, fire safety, and more reliable operation.

Figure 10:
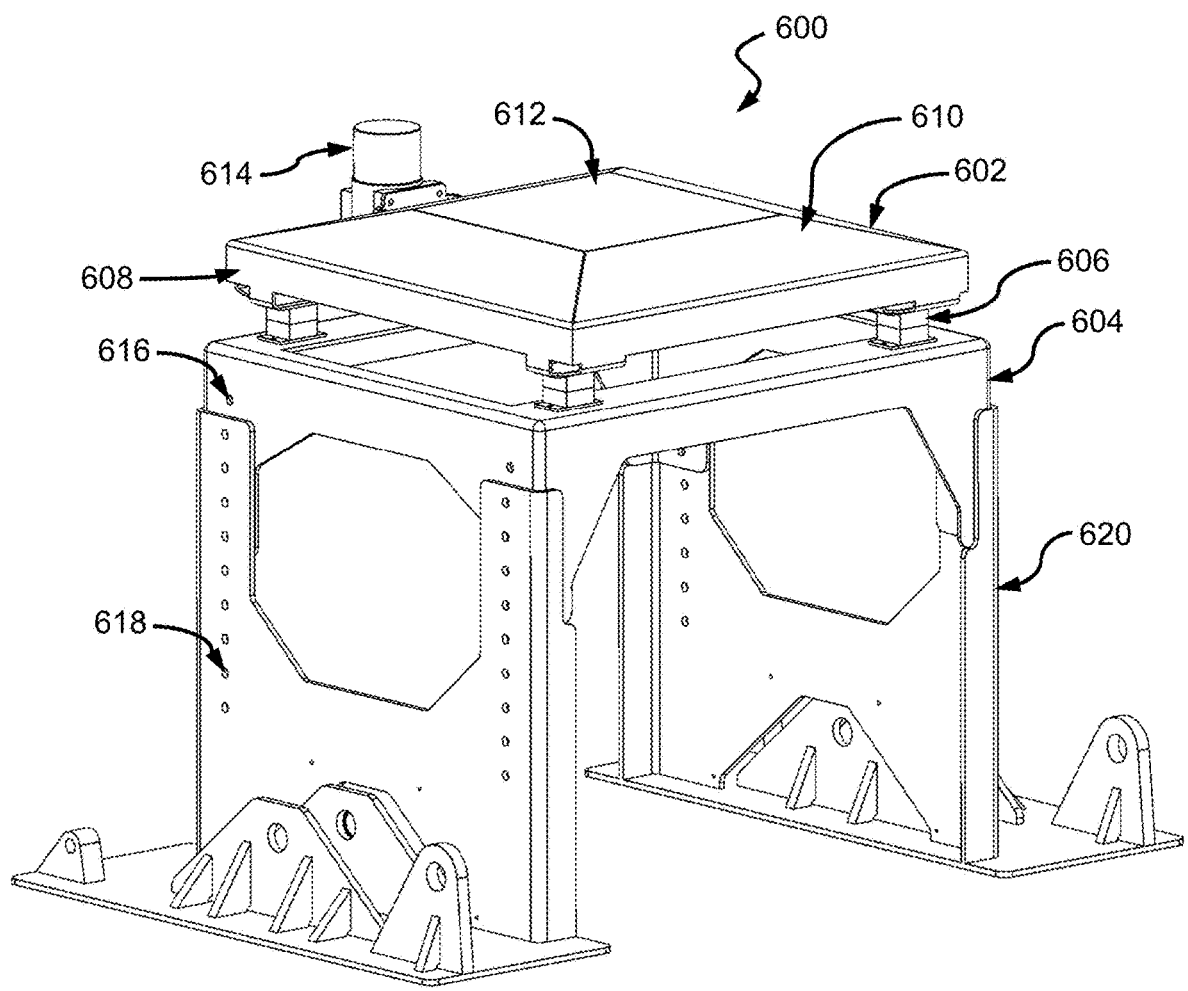
FIG. 10 is a perspective view of a bulk container platform assembly, in accordance with aspects of the present disclosure.

Referring to FIG. 10, a perspective view of a bulk container platform assembly 600 of a bulk container handling assembly is depicted, according to an embodiment. Bulk container platform assembly 600 is configured to support, vibrate, and/or weigh a bulk container.

Bulk container platform assembly 600 generally includes platform 602 which couples to platform frame 604 by way of (e.g., four) vibration isolators 606. As illustrated, the bag pan is generally rectangular in transverse shape, but can be any desired shape. The bag pan includes an outer peripheral flange 608 that traverses and extends downwardly from the perimeter of the bag pan, coupled directly or indirectly to one or a plurality (e.g., 4) of adjoining panels 610 that cooperate to form a rise, or inclined surface that approaches a central plateau 612.

Platform 602 is coupled to a vibrator 614 that is configured to induce vibration of platform 602. The mechanical energy of vibrator 614 (e.g., a vibration motor) is transmitted via direct contact to the contents of a bulk container to help loosen and distribute the contents.

Vibration isolators 606 are each bolted to the lower surface of outer peripheral flange 608 and to an upper surface of platform frame 604 by way of respectively aligned bolt holes. Plates of vibration isolators 606 are attached to each other and separated by a material that can absorb and/or deflect vibration (e.g., rubber or other polymer and/or a compression coil spring).

Platform frame 604 includes a holes 616 configured to align with corresponding holes 618 of base 620. One or both of holes 616 and holes 620 are positioned at varying heights such that a fastener (not shown) can be used to selectively couple platform frame 604 to base 620 at a desired height.

Figure 11:
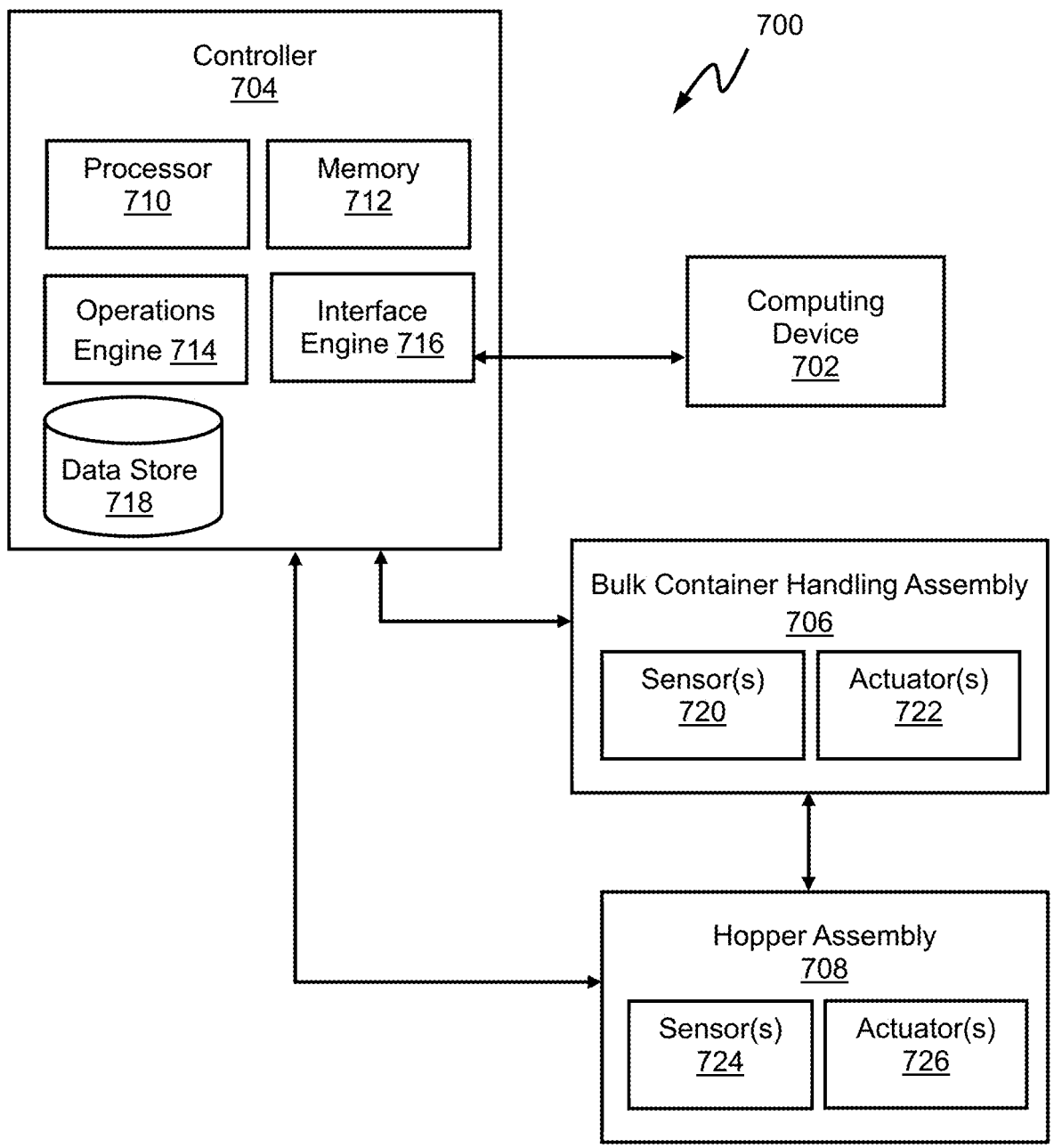
FIG. 11 is a block diagram of a system for filling and transporting a bulk container, in accordance with aspects of the present disclosure.

Referring to FIG. 11, a block diagram of a system 700 for filing and transporting bulk containers is depicted, according to an embodiment. System 700 is configured to automatically fill and transport bulk containers. System 700 includes computing device 702, controller 704, bulk container handling assembly 706, and hopper assembly 708. In examples, a system 700 can be equipped with a series of bulk container handling assemblies 706 and/or hopper assemblies 708.

Computing device 702 comprises an electronic device in communication with system 700. In an example, computing device 702 can be desktop computer, a laptop computer, tablet, mobile computing device, server, workstation, or Internet-of-things (IoT) device, among other electronic devices. Though depicted as communicatively coupled to a single computing device, system 700 can, in other embodiments, include a plurality of computing devices 702, such as a networked system of devices. In embodiments, computing device 702 can be utilized by a user to interact with other components of system 700, such as controller 704, to configure filing cycles or other operations and/or obtain operations data.

Controller 704 generally comprises processor 710, memory 712, operations engine 714, interface engine 716, and data store 718. Controller 704 generally provides capabilities to operate an workstations along an assembly line, such as bulk container handling assembly 706 and hopper assembly 708. In examples, controller 704 is configured to allow for adjustment of bulk container handling assembly 706 and/or hopper assembly 708. For example, controller 704 can automatically open hooks of bulk container handling assembly 706. For example, controller 704 can automatically discharge stored material from hopper assembly 708.

In an embodiment, as illustrated in FIG. 11, controller 704 is implemented on a single device, such as a server, having its own processor and memory. In embodiments, controller 704 can be a cloud-based service such that control of packaging assemblies can be distributed across a network of multiple computing devices (e.g., with each device having its own processor and memory).

Embodiments described herein include various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques.

An (e.g., each) engine can be realized in a variety of physically realizable configurations and should generally not be limited to any particular implementation exemplified herein, unless such limitations are expressly identified. In addition, an engine can itself be composed of sub-engines, each of which can be regarded as an engine in its own right. Moreover, in the embodiments described herein, each of the various engines corresponds to a defined functionality; however, it should be understood that in other contemplated embodiments, each functionality can be distributed to more than one engine. Likewise, in other contemplated embodiments, multiple defined functionalities can be implemented by a single engine that performs those multiple functions, possibly alongside other functions, or distributed differently among a set of engines than specifically illustrated in the examples herein.

Operations engine 714 is (pre) configured to process operational events and notify computing device 702 of relevant events and data. For example, operations engine 714 can act as a manager that maintains the state and progress of assemblies and subassemblies throughout the bulk container handling workflow. In such an embodiment, operations engine 714 can capture (e.g., track) the status, history, and/or metadata associated with each assembly, allowing for real-time monitoring, reporting, and analysis.

In an embodiment, operations engine 714 monitors event states and/or receives data regarding event states across assemblies and systems. For example, operations engine 714 can detect or determine a data event from a bulk container handling assembly 706 (e.g., a weight of a bulk container) that can lead to one or many actions in a hopper assembly 708 (e.g., shutoff of product discharge).

Interface engine 716 provides input/output capabilities of controller 704. In an embodiment, interface engine 716 can comprise an interface, such as a graphical user interface (GUI), configured to display related event topic fields and schemas and receive user input. For example, a user can interact with a GUI provided by interface engine 716 to control one or more processes of bulk container handling assembly.

Interface engine 716 can include graphical or text-based interfaces for defining bulk container parameters. In an embodiment, interface engine 716 generates monitoring dashboards (e.g., reporting tools and analytics capabilities) to track the performance, efficiency, and compliance of assemblies.

Data store 718 comprises one or more storage repositories, such as a database, logical disk space, file, or other suitable storage medium configured to store operations data. In an embodiment of a database, data store 718 can be a general-purpose database management storage system (DBMS) or relational DBMS as implemented by, for example, ORACLE, IBM DB2, Microsoft SQL Server, PostgreSQL, MySQL, SQLite, LINUX, or UNIX solutions.

In an embodiment, data store 718 can be external to controller 704. For example, data store 718 can be communicatively coupled to controller 704 over a network.

In an embodiment, controller 704 can access data store 718. In embodiments, computing device 702 is provided access to all or a subset of operations data in data store 718 (e.g., operations data applicable to a particular packaging assembly or system can be provided).

In an embodiment, a user can provide operations data to data store 718 using computing device 702. In another embodiment, operations engine 714 itself can actively gather or request event data from computing device 702, bulk container handling assembly 706, or hopper assembly 708.

Bulk container handling assembly 706 is configured to capture data from sensors 720 and enact operational commands via actuators 722. For example, bulk container handling assembly 706 generally includes a vibration motor that can be activated to distribute product within a bulk container during a filling cycle.

In some embodiments, control of actuators 722 (e.g., if pneumatic or hydraulic) can be facilitated by interposing one or more actuatable valves (e.g., a valve manifold), controlled by processor 710, along the fluid path between a pressurized fluid supply (e.g., pump, compressor and/or reservoir) and the drive pistons.

Figure 12:
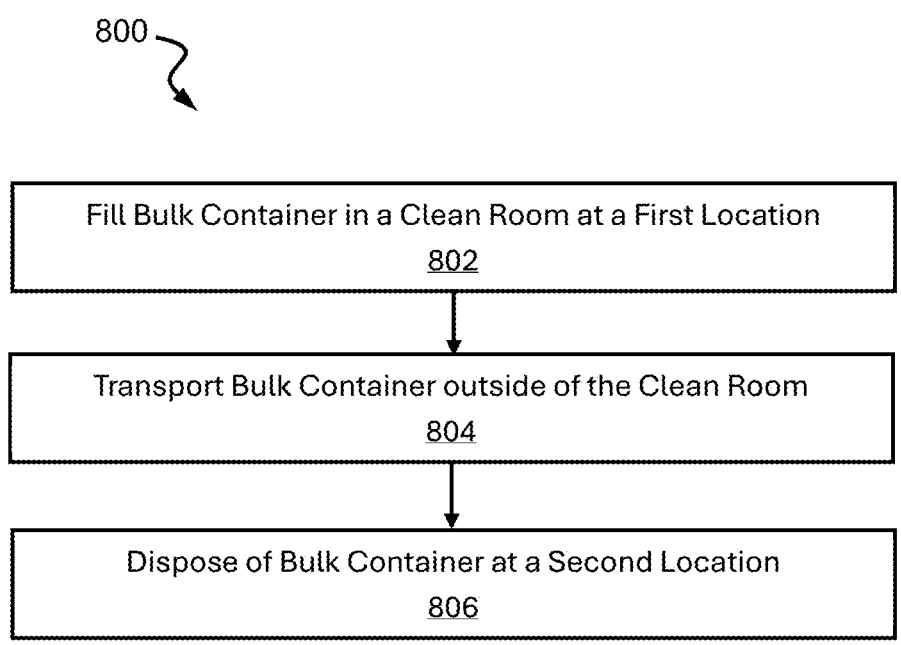
FIG. 12 is a flow chart of a method for filling and transporting a bulk container, in accordance with aspects of the present disclosure.

Referring to FIG. 12, a flowchart of a method 800 for transporting a bulk container is depicted, according to an embodiment.

At 802, method 800 comprises filling a bulk container in a clean room environment at a first location. In some implementations, the first location can be a platform associated with a bulk container handling assembly.

At 804, method 800 comprises transporting the bulk container outside of the clean room environment.

In some embodiments, the bulk container is suspended above the ground and/or directed through an environmental barrier during transportation. The environmental barrier can separate the clean room environment from the non-clean room environment.

At 806, method 800 comprises disposing of (e.g., releasing) the bulk container at a second location.

In some embodiments, the second surface is one of a pallet, a conveyor, or an autonomous robot.

In some embodiments, the bulk container is lifted from a first surface at the first location and transported above the ground during the transporting step and lowered onto a second surface at the second location during the disposing step.

In some embodiments, the bulk container can be raised and lowered by a bulk container handling assembly that includes a pivoting frame that pivots downwardly to engage the bulk container in the first location and pivots upwardly beyond a maximum height and downwardly toward the second location.

In one aspect, embodiments of the present disclosure provide for improved cleanliness and reduced contamination when transporting a bulk container out of a clean room environment. For example, a bulk container handling assembly as described herein is a floor-based system that can be easier to clean and maintain due to more easily accessible surfaces (e.g., compared to overhead systems). Moreover, embodiments provide for a bulk container handling assembly that has no components exposed to a non-clean room environment during a filling cycle.

In one aspect, embodiments of the present disclosure provide for more compact working envelope. Embodiments of the present disclosure incorporate a low pivot point, resulting in the bulk container assemblies requiring less operating space and a minimal footprint. The small operating envelope facilitates integration with other (e.g., existing) equipment, such as forklifts, pallet jacks, and conveyors.

Various examples of systems, devices, and methods have been described herein. Although features and elements described above are described in particular combinations, each feature or element can be used alone without the other features and elements of the examples or in various combinations with or without other features and elements. For example, while various materials, dimensions, shapes, configurations and locations, etc. have been described for use with disclosed examples, others besides those disclosed can be utilized without exceeding the scope of the claimed inventions.

Persons of ordinary skill in the relevant arts will recognize that the subject matter hereof can comprise fewer features than illustrated in any individual example described above. The examples described herein are not meant to be an exhaustive presentation of the ways in which the various features of the subject matter hereof can be combined. Accordingly, the examples are not mutually exclusive combinations of features; rather, the various examples can comprise a combination of different individual features selected from different individual examples, as understood by persons of ordinary skill in the art. Moreover, elements described with respect to one example can be implemented in other embodiments even when not described in such embodiments unless otherwise noted.

For purposes of interpreting the claims, it is expressly intended that the provisions of 35 U.S.C. § 112 (f) are not to be invoked unless the specific terms "means for" or "step for" are recited in a claim.

The invention claimed is:

1. A method for filling bulk containers, comprising:
    coupling a bulk container to a pivoting frame, the pivoting frame being configured to articulate about a first pivot;
    filling the bulk container in a clean room environment at a first location on a first surface located at a first height above the first pivot;
    transporting the bulk container out of the clean room environment into a non-clean room environment by articulating the pivoting frame about the first pivot; and
    disposing the bulk container in a second location within the non-clean room environment onto a second surface at a second height less than the first height, wherein an upper surface of the container is located at a height above the first pivot when the bulk container is disposed in the second location.

2. The method of claim 1, wherein transporting the bulk container out of the clean room environment includes:
    lifting the bulk container from the first surface at the first location; and
    lowering the bulk container along an arcuate path onto the second surface at the second location.

3. The method of claim 2, wherein the second surface is one of a pallet, a conveyor, or an autonomous robot.

4. The method of claim 1, wherein lifting the bulk container from the first surface at the first location comprises adjusting the pivoting frame to engage the bulk container in the first location.

5. The method of claim 1, wherein the pivoting frame is operably coupled to an actuator and a linkage, wherein the actuator is configured to rotate the pivoting frame about the first pivot using the linkage.

6. A bulk container handling system comprising:
    a base portion located in in a clean room environment;
    a platform disposed on the base portion, the platform being configured to support a bulk container;
    an articulating arm pivotally coupled to the base portion at a first pivot, wherein the articulating arm is configured to lift a bulk container from the platform;
    a carriage coupled to a distal end of the articulating arm, wherein the carriage includes at least one hook configured to selectively secure a loop of a bulk container;
    an actuator coupled to the base portion;
    a linkage separately and pivotally coupled to the base portion, the articulating arm, and the actuator, wherein the actuator is configured to rotate the at least one articulating arm about the first pivot via the linkage to move the bulk container from a first position above the platform to a second position below and adjacent the platform, wherein the carriage is disposed above the first pivot when the bulk container is in the first position and in the second position.

7. The system of claim 6, wherein rotating the at least one articulating arm about the first pivot transports a bulk container lifted by the articulating arm to a non-clean room environment.

8. The system of claim 7, wherein an environmental barrier separates the clean room environment from the non-clean room environment, and wherein rotating the at least one articulating arm about the first pivot directs a bulk container lifted by the articulating arm through the environmental barrier.

9. The system of claim 7, wherein the articulating arm is configured to dispose of a bulk container onto a surface in the non-clean room environment.

10. The system of claim 9, wherein the surface is one of a pallet, a conveyor, or an autonomous robot.

11. The system of claim 6, wherein the height of the first pivot is less than the height of the platform.

12. The system of claim 6, wherein the height of the first pivot is less than the height of a bulk container when lifted and the height of the platform is adjustable relative to the base portion.

13. The system of claim 6, wherein the at least one hook is slidably coupled to the carriage, and the carriage includes a locking mechanism configured to selectively prevent slidable movement of the at least one hook.

14. The system of claim 6, further comprising a linear actuator configured to articulate the carriage along a portion of the articulating arm.

15. The system of claim 6, wherein lifting a bulk container from the platform comprises upwardly pivoting the articulating arm beyond a maximum height.

16. The system of claim 6, wherein the first pivot is located proximate a surface on which the base portion rests.

17. The system of claim 6, wherein the linkage is coupled to the base portion at a second pivot.

18. The system of claim 17, wherein the first pivot and the second pivot are at about the same vertical height.

19. The system of claim 6, wherein the bulk container includes a bulk bag including a plurality of loops disposed proximate an upper surface of the bulk bag.

20. The method of claim 1, wherein the bulk container includes a bulk bag including a plurality of loops disposed proximate an upper surface of the bulk bag.

* * * * *